US012705179B2

(12) United States Patent
Hyun

(10) Patent No.: US 12,705,179 B2
(45) Date of Patent: Aug. 11, 2026

(54) MEMORY MODULE, MEMORY SYSTEM INCLUDING MEMORY MODULE, AND METHOD OF OPERATING THE SAME

(71) Applicant: SK hynix Inc., Gyeonggi-do (KR)

(72) Inventor: Sung Woo Hyun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 13 days.

(21) Appl. No.: 18/786,600

(22) Filed: Jul. 29, 2024

(65) Prior Publication Data

US 2024/0385968 A1 Nov. 21, 2024

Related U.S. Application Data

(63) Continuation-in-part of application No. 17/891,269, filed on Aug. 19, 2022, now Pat. No. 12,346,600.

(30) Foreign Application Priority Data

Aug. 26, 2021 (KR) ........................ 10-2021-0113466
Apr. 21, 2022 (KR) ........................ 10-2022-0049741

(51) Int. Cl.
*G06F 12/0862* (2016.01)
*G06F 12/12* (2016.01)

(52) U.S. Cl.
CPC .......... *G06F 12/0862* (2013.01); *G06F 12/12* (2013.01)

(58) Field of Classification Search
CPC .... G06F 3/0659; G06F 3/0604; G06F 3/0631; G06F 3/0679; G06F 12/0862; G06F 2216/13; G06F 2212/6026
See application file for complete search history.

(56) References Cited

U.S. PATENT DOCUMENTS 9,239,794 B1 * 1/2016 Merchant ............ G06F 12/0868
9,251,083 B2 2/2016 Hooker et al.
9,378,153 B2 6/2016 Jafri et al.
9,779,029 B2 10/2017 Frachtenberg et al.
9,817,764 B2 11/2017 Hooker et al.
10,802,977 B2 10/2020 Mappouras et al.
10,877,889 B2 * 12/2020 Roberts ............... G06F 12/0862
(Continued)

FOREIGN PATENT DOCUMENTS

CN 110895446 A 3/2020
TW 201918883 A 5/2019

OTHER PUBLICATIONS

Notice of Allowance for U.S. Appl. No. 17/891,269 issued by the USPTO on Mar. 5, 2025.
(Continued)

*Primary Examiner* — Idriss N Alrobaye
*Assistant Examiner* — Richard B Franklin
(74) *Attorney, Agent, or Firm* — IP & T GROUP LLP

(57) ABSTRACT

The present technology relates to an electronic device. According to the present technology, a memory module communicating with a host through a compute express link (CXL) interface includes a non-volatile memory device, a volatile memory device and a memory controller. The non-volatile memory device may store data. The memory controller may select candidate data to be prefetched among the data based on access pattern information of the host for the data and a plurality of algorithms, and prefetch target data among the candidate data to the volatile memory device.

2 Claims, 24 Drawing Sheets

(56) References Cited

U.S. PATENT DOCUMENTS

| | | | | |
|---|---|---|---|---|
| 11,194,728 | B2 | 12/2021 | Roberts | |
| 11,455,098 | B2 * | 9/2022 | Pawlowski | G06F 3/0629 |
| 12,332,740 | B2 * | 6/2025 | Guim Bernat | G06F 12/0238 |
| 2021/0200445 | A1 | 7/2021 | Pawlowski | |

OTHER PUBLICATIONS

Office Action for Taiwanese Patent Application No. 111132209 issued by the Taiwanese Patent Office on Feb. 11, 2026.

Office Action for U.S. Appl. No. 18/786,597 issued by the USPTO on Oct. 1, 2025.

Office Action for U.S. Appl. No. 18/786,577 issued by the USPTO on Sep. 23, 2025.

* cited by examiner

Memory Module

1100

1200

Host

Interface

Memory Controller

Memory Device

FIG. 3B

| Prefetch Table | | | | |
|---|---|---|---|---|
| Location | Spatial Locality | Temporal Locality | Overall Locality | Prefetch Locality |
| L1 | 1 | 0 | 1 | 4 |
| L2 | 2 | 2 | 4 | 2 |
| L3 | 3 | 2 | 5 | 1 |
| L4 | 0 | 3 | 3 | 3 |

FIG. 17

MEMORY MODULE, MEMORY SYSTEM INCLUDING MEMORY MODULE, AND METHOD OF OPERATING THE SAME

CROSS-REFERENCE TO RELATED APPLICATION

The present application is a continuation-in-part (CIP) application of U.S. patent application Ser. No. 17/891,269 filed on Aug. 19, 2022, which claims priority under 35 U.S.C. § 119 (a) to Korean patent application number 10-2021-0113466 filed on Aug. 26, 2021 and Korean patent application number 10-2022-0049741 filed on Apr. 21, 2022, in the Korean Intellectual Property Office, the entire disclosure of which is incorporated by reference herein.

BACKGROUND

1. Field of Invention

The present disclosure relates to an electronic device, and more particularly, to a memory module, a memory system including the memory module, and a method of operating the same.

2. Description of Related Art

A memory module is a device that stores data under control of a host device such as a computer or a smartphone. The memory module may include a memory device in which data is stored and a memory controller controlling the memory device. The memory device is divided into a volatile memory device and a nonvolatile memory device.

The volatile memory device is a device that stores data only when power is supplied and loses the stored data when the power supply is cut off. The volatile memory device includes a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a memory module prefetching or expelling data based on an access pattern of a host, a memory system including the memory module, and a method of operating the same.

According to an embodiment of the present disclosure, a memory module that communicates with a host through a compute express link (CXL) interface may include a memory device and a memory controller. The memory device may store data. The memory controller may store access pattern information of the host for data, select candidate data to be prefetched from among the data based on the access pattern information of the host and a plurality of algorithms, and prefetch target data among the candidate data.

According to an embodiment of the present disclosure, a memory controller may include a cache memory, a map management data storage, and a prefetch controller. The cache memory may store target data. The map management data storage may store access pattern information of the host and a prefetch table indicating a prefetch priority of candidate data. The prefetch controller may prefetch target data among the candidate data from the memory device into the cache memory by referring to the prefetch table.

According to an embodiment of the present disclosure, a prefetch controller may include a plurality of prefetchers corresponding to a plurality of respective algorithms, and calculate a prefetch priority of candidate data based on the plurality of algorithms and access pattern information of a host.

According to an embodiment of the present disclosure, a plurality of algorithms may include at least one of a temporal locality algorithm, a spatial locality algorithm, a branch locality algorithm, an equidistant locality algorithm, and a sequential locality algorithm.

According to an embodiment of the present disclosure, a method of operating a memory module communicating with a host through a compute express link (CXL) interface and including a memory device and a cache memory may include calculating a prefetch priority of candidate data among data based on a result of inputting access pattern information of the host for the data stored in the memory device to a plurality of algorithms, and prefetching target data selected according to the prefetch priority among the candidate data into the cache memory.

According to an embodiment of the present disclosure, a plurality of algorithms may include at least one of a temporal locality algorithm, a spatial locality algorithm, a branch locality algorithm, an equidistant locality algorithm, and a sequential locality algorithm.

According to an embodiment of the present disclosure, a memory system may include a first memory module and a second memory module. The first memory module may communicate with a host through a first interface. The second memory module may communicate with the host through a second interface. The first memory module may include a memory device and a memory controller. The memory device may include a plurality of zones allocated by the host. The memory controller may prefetch data stored in the second memory module into the plurality of zones based on access pattern information of the host for the plurality of zones.

According to an embodiment of the present disclosure, a method of operating a memory system including a first memory module and a second memory module may include allocating a storage area of the first memory module communicating with a host through a first interface into a plurality of zones according to a core, a thread, or an application of the host, and prefetching data stored in the second memory module communicating with the host through a second interface into each of the plurality of zones based on access pattern information of the host for each of the plurality of zones.

According to an embodiment of the present disclosure, a memory system may include a first memory module and a second memory module. The first memory module may communicate with a host through a first interface. The second memory module may communicate with the host through a second interface. The second memory module may include a memory device and a memory controller. The memory device may include a plurality of zones allocated by the host. The memory controller may provide data stored in the plurality of zones to the first memory module based on access pattern information of the host for the plurality of zones.

According to an embodiment of the present disclosure, a method of operating a memory system including a first memory module and a second memory module may include allocating a storage area of the second memory module communicating with a host through a second interface to a plurality of zones according to a core, a thread, or an application of the host, and prefetching data stored in the plurality of zones into the first memory module communicating with the host through a first interface, based on access pattern information of the host for each of the plurality of zones.

According to an embodiment of the present disclosure, a memory system may include a host, a first memory module, and a second memory module. The first memory module may communicate with the host through a first interface. The second memory module may communicate with the host through a second interface. The host may include a cache memory, a buffer memory, and a host processor. A tier of the buffer memory may be lower than that of the cache memory. The host processor may determine target data to be prefetched from a second tier memory of which a priority is lower than that of a first tier memory to the first tier memory in an access request of the host, based on an address of a cache missed request from the cache memory and program counter information.

According to an embodiment of the present disclosure, a host processor may include a program counter and a map manager. The program counter may generate program counter information indicating an address of an instruction to be executed next to a request. The map manager may determine data predicted to be accessed as target data based on an address of a cache missed request and the program counter information.

According to an embodiment of the present disclosure, when a target data is stored in a first tier memory, a host processor may adjust an eviction priority of the target data.

According to an embodiment of the present disclosure, a host processor may lower an eviction priority of target data in a first tier memory.

According to an embodiment of the present disclosure, when target data is not stored in a first tier memory, a host processor may receive the target data from a second tier memory and prefetch the target data into the first tier memory.

According to an embodiment of the present disclosure, a first interface may include a dual inline memory module (DIMM) interface, and a second interface may include a compute express link (CXL) interface.

According to an embodiment of the present disclosure, a first memory module may be a first tier memory and a second memory module may be a second tier memory.

According to an embodiment of the present disclosure, a buffer memory may be a first tier memory, and a first memory module may be a second tier memory.

According to an embodiment of the present disclosure, a buffer memory may be a first tier memory, and a second memory module may be a second tier memory.

According to an embodiment of the present disclosure, a method of operating a memory system including a first tier memory and a second tier memory may include determining data predicted to be accessed as target data based on program count information indicating an address of a cache missed request from a cache memory and an address of an instruction to be executed next to the cache missed request, and performing a memory management operation of adjusting an eviction priority of the target data or prefetching the target data into the first tier memory, based on whether the target data is stored in the first tier memory.

According to an embodiment of the present disclosure, performing a memory management operation may include adjusting an eviction priority of target data in a first tier memory when the target data is stored in the first tier memory.

According to an embodiment of the present disclosure, performing a memory management operation may include receiving target data from a second tier memory of which a priority is lower than that of a first tier memory in an access request of a host and prefetching the target data into the first tier memory, when the target data is not stored in the first tier memory.

According to an embodiment of the present disclosure, a first tier memory may communicate with a host through a dual inline memory module (DIMM) interface, and a second tier memory may communicate with the host through a compute express link (CXL) interface.

According to an embodiment of the present disclosure, a memory module may include a memory device and a memory controller. The memory device may include a plurality of rows for storing cache data and tag data indicating a location of the cache data. The memory controller may store tag group data obtained by collecting the tag data in target rows among the plurality of rows.

According to an embodiment of the present disclosure, a memory controller may set rows in which a hammer count in which a bit flip occurs is lower than a threshold value among a plurality of rows as target rows.

According to an embodiment of the present disclosure, a memory controller may set target rows based on row management information indicating rows of which a physical characteristic is weak among a plurality of rows.

According to an embodiment of the present disclosure, a memory controller may perform a refresh operation by applying a voltage to rows adjacent to target rows among a plurality of rows.

According to an embodiment of the present disclosure, a memory device may include a random access memory.

According to an embodiment of the present disclosure, a method of operating a memory module including a plurality of rows may include selecting rows in which a hammer count in which a bit flip occurs is lower than a threshold value among the plurality of rows as target rows, and storing tag group data obtained by collecting tag data indicating a location of cache data in the target rows.

According to an embodiment of the present disclosure, a method of operating a memory module may further include performing a refresh operation by applying a voltage to rows adjacent to target rows among a plurality of rows.

According to an embodiment of the present disclosure, a memory system may include a host, a first memory module, and a second memory module. The first memory module may communicate with the host through a first interface. The second memory module may communicate with the host through a second interface. The first memory module may include a memory device and a memory controller. The memory device may include a plurality of rows for storing cache data and tag data indicating a location of the cache data. The memory controller may store tag group data obtained by collecting the tag data in target rows among the plurality of rows.

According to an embodiment of the present disclosure, a memory controller may set rows in which a hammer count in which a bit flip occurs is lower than a threshold value among a plurality of rows as target rows.

According to an embodiment of the present disclosure, a memory controller may perform a refresh operation by applying a voltage to rows adjacent to target rows among a plurality of rows.

According to an embodiment of the present disclosure, a first memory module may be used as a cache memory of a host, and a second memory module may have a tier lower than that of a first memory module in an access request of the host.

According to an embodiment of the present disclosure, a first memory module may communicate with a host through any one of a dual inline memory module (DIMM) interface and a compute express link (CXL) interface.

According to an embodiment of the present disclosure, a memory module communicating with a host through a compute express link (CXL) interface may include a non-volatile memory device, a volatile memory device, and a memory controller. The non-volatile memory device may store data. The memory controller may select candidate data to be prefetched among the data based on access pattern information of the host for the data and a plurality of algorithms, and prefetch target data among the candidate data to the volatile memory device.

According to the present technology, a memory module prefetching or evicting data based on a host access pattern, and a method of operating the same are provided.

BRIEF DESCRIPTION OF THE DRAWINGS

FIG. 1 is a diagram illustrating a memory system according to an embodiment of the present disclosure.

FIG. 3B is a diagram illustrating a prefetch table.

FIG. 17 is a diagram illustrating a configuration and an operation of a memory module according to an embodiment.

DETAILED DESCRIPTION

Figure 2:
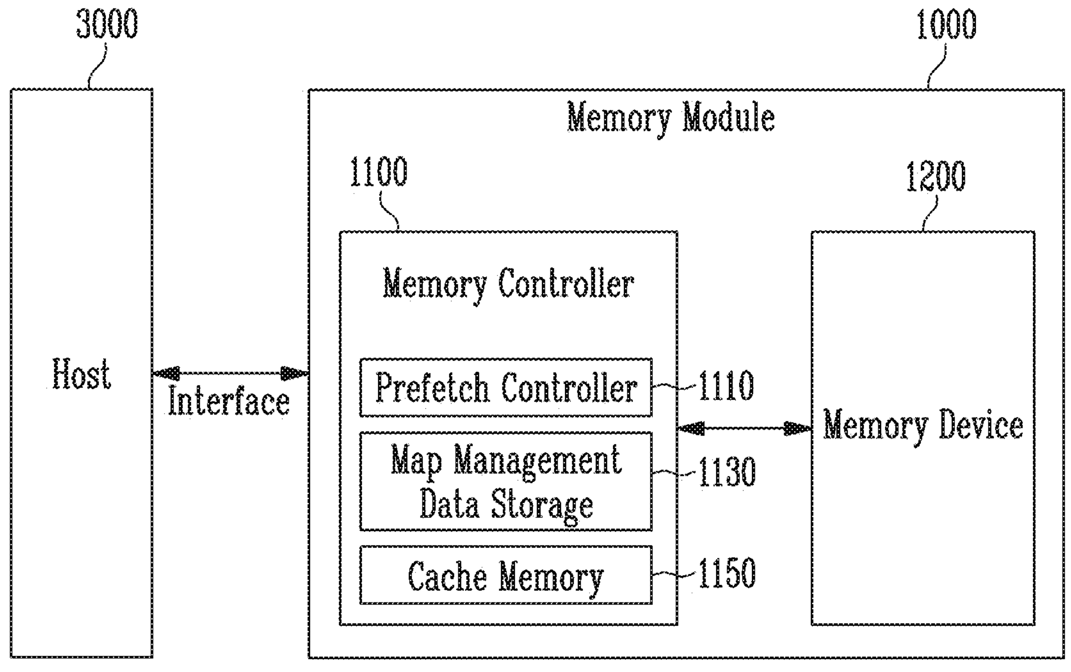
FIG. 2 is a diagram illustrating a configuration and an operation of a memory module according to an embodiment.

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
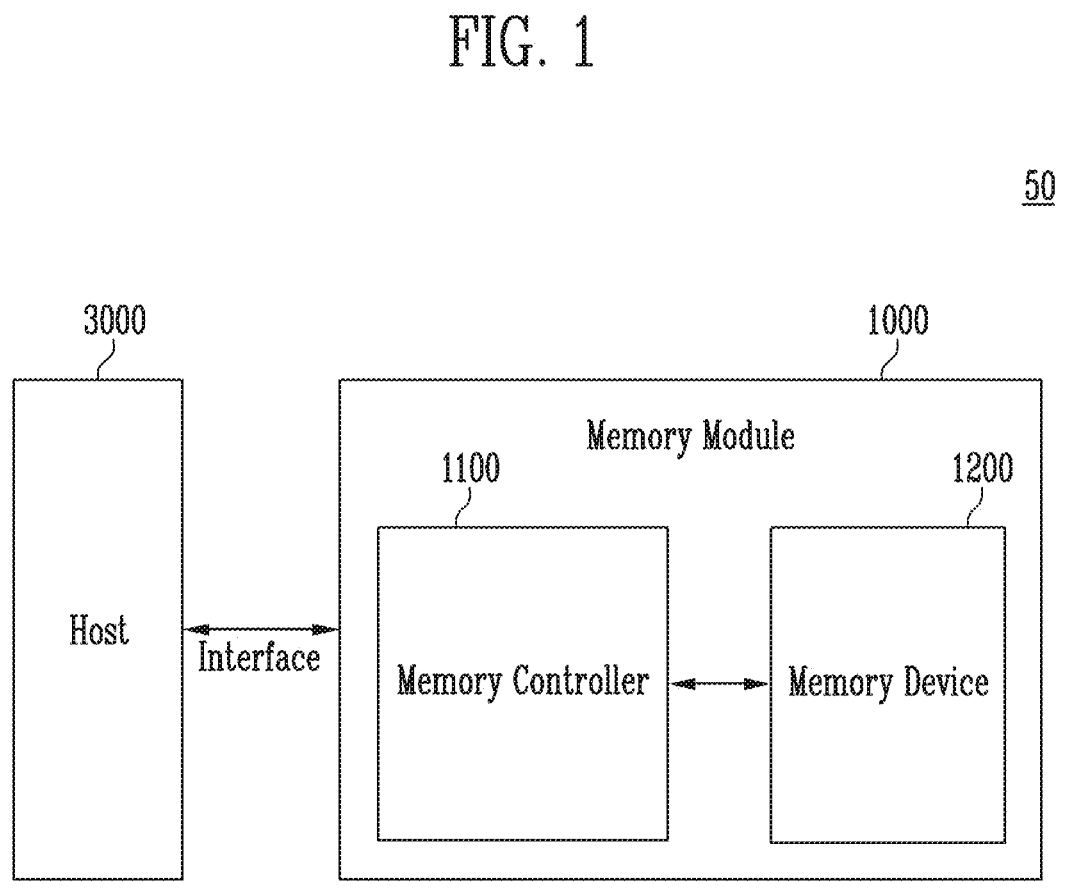

FIG. 1 is a diagram illustrating a memory system according to an embodiment of the present disclosure.

Referring to FIG. 1, the memory system 50 may include a memory module 1000 and a host 30000.

The memory module 1000 may include a memory device 1200 and a memory controller 1100 that controls an operation of the memory device. The memory module 1000 is a device that stores data under control of the host 30000 such as a cellular phone, a smartphone, an MP3 player, a laptop computer, a desktop computer, a game player, a TV, a tablet PC, or an in-vehicle infotainment system.

The memory module 1000 may be manufactured as one of various types of storage devices according to a host interface that is a communication method with the host 3000. For example, the memory module 1000 may be configured as any one of various types of memory modules such as an SSD, a multimedia card in a form of an MMC, an eMMC, an RS-MMC and a micro-MMC, a secure digital card in a form of an SD, a mini-SD and a micro-SD, a universal serial bus (USB) memory module, a universal flash storage (UFS) device, a personal computer memory card international association (PCMCIA) card type memory module, a peripheral component interconnection (PCI) card type memory module, a PCI express (PCI-E) card type memory module, a compact flash (CF) card, a smart media card, and a memory stick.

The memory module 1000 may be manufactured as any one of various types of packages. For example, the memory module 1000 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 1200 may store data. The memory device 1200 operates under control of the memory controller 1100. The memory device 1200 may include a memory cell array including a plurality of memory cells that store data.

Each of the memory cells may be configured as a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks. Each memory block may include a plurality of memory cells. One memory block may include a plurality of pages. In an embodiment, the page may be a unit for storing data in the memory device 1200 or reading data stored in the memory device 1200.

The memory block may be a unit for erasing data. In an embodiment, the memory device 1200 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access random access memory (PRAM), a magnetoresistive random access memory (MRAM), a ferroelectric random access memory (FRAM), a spin transfer torque random access memory (STT-RAM), or the like.

The memory device 1200 is configured to receive a command and an address from the memory controller 1100 and access an area selected by the address of the memory cell array. That is, the memory device 1200 may perform an operation instructed by the command on the area selected by the address. For example, the memory device 1200 may perform a write operation (program operation), a read operation, and an erase operation. During the program operation, the memory device 1200 may program data to the area selected by the address. During the read operation, the memory device 1200 may read data from the area selected by the address. During the erase operation, the memory device 1200 may erase data stored in the area selected by the address.

The memory controller 1100 controls an overall operation of the memory module 1000.

When power is applied to the memory module 1000, the memory controller 1100 may execute firmware FW. When the memory device 1200 is a flash memory device, the memory controller 1100 may operate firmware such as a flash translation layer (FTL) for controlling communication between the host 3000 and the memory device 1200.

In an embodiment, the memory controller 1100 may receive data and a logical address from the host 3000. The memory controller 1100 may convert the logical address into a physical address indicating a location of memory cells of the memory device 1200 in which data is to be stored.

The memory controller 1100 may control the memory device 1200 to perform the program operation, the read operation, or the erase operation in response to a request of the host 3000. During the program operation, the memory controller 1100 may provide a write command, a physical block address, and data to the memory device 1200. During the read operation, the memory controller 1100 may provide a read command and the physical block address to the memory device 1200. During the erase operation, the memory controller 1100 may provide an erase command and the physical block address to the memory device 1200.

In an embodiment, the memory controller 1100 may generate and transmit the command, the address, and the data to the memory device 1200 regardless of the request from the host 3000. For example, the memory controller 1100 may provide the command, the address, and the data to the memory device 1200 so as to perform background operations for wear leveling, garbage collection, auto refresh, and read reclaim.

In an embodiment, the memory controller 1100 may control at least two memory devices 1200.

The host 3000 may communicate with the memory module 1000 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a compute express link (CXL), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

FIG. 2 is a diagram illustrating a configuration and an operation of a memory module according to an embodiment.

Referring to FIG. 2, the memory module 1000 may include the memory controller 1100 and the memory device 1200. The memory device 1200 may include at least one of a volatile memory device and a nonvolatile memory device.

The memory controller 1100 may communicate with the host 3000 through an interface. The interface may include a compute express link (CXL) and a dual in-line memory module (DIMM).

The memory controller 1100 may store access pattern information of the host 3000 for data stored in the memory device 1200. The memory controller 1100 may select candidate data to be prefetched from among data stored in the memory device 1200 based on the access pattern information of the host 3000 and a plurality of algorithms. The memory controller 1100 may prefetch target data among the candidate data.

The memory controller 1100 may include a prefetch controller 1110, a map management data storage 1130, and a cache memory 1150.

The prefetch controller 1110 may prefetch the target data selected from among the candidate data from the memory device 1200 into the cache memory 1150 with reference to the prefetch table. For example, the prefetch controller 1110 may select data of which a prefetch priority is highest among the candidate data as the target data. The prefetch controller 1110 may select the number of data set in an order in which a prefetch priority is high among the candidate data.

The map management data storage 1130 may store the access pattern information of the host 3000. The map management data storage 1130 may store the prefetch table indicating the prefetch priority of the candidate data.

The cache memory 1150 may store the target data received from the memory device 1200.

The prefetch controller 1110 may include a plurality of prefetchers corresponding the plurality of respective algorithms. The plurality of algorithms may include a temporal locality algorithm and a spatial locality algorithm.

The prefetch controller 1110 may calculate the prefetch priority of the candidate data based on the plurality of algorithms and the access pattern information of the host. For example, the prefetch controller 1110 may calculate the prefetch priority of the candidate data by synthesizing a prefetch priority of candidate data calculated based on a first algorithm among the plurality of algorithms and a prefetch priority of candidate data calculated based on a second algorithm. The number of algorithms used to calculate the prefetch priority is not limited to the present embodiment. In various examples, the prefetch controller 1110 may calculate a prefetch final priority of the candidate data by varying a weight of each algorithm.

Figure 3A:
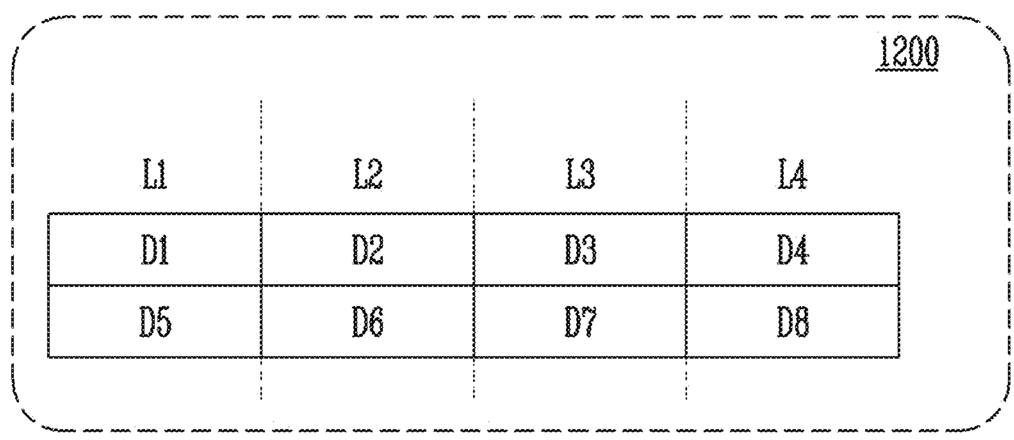
FIG. 3A is a diagram illustrating an access pattern of a host for data stored in a memory device.
Figure 3A:
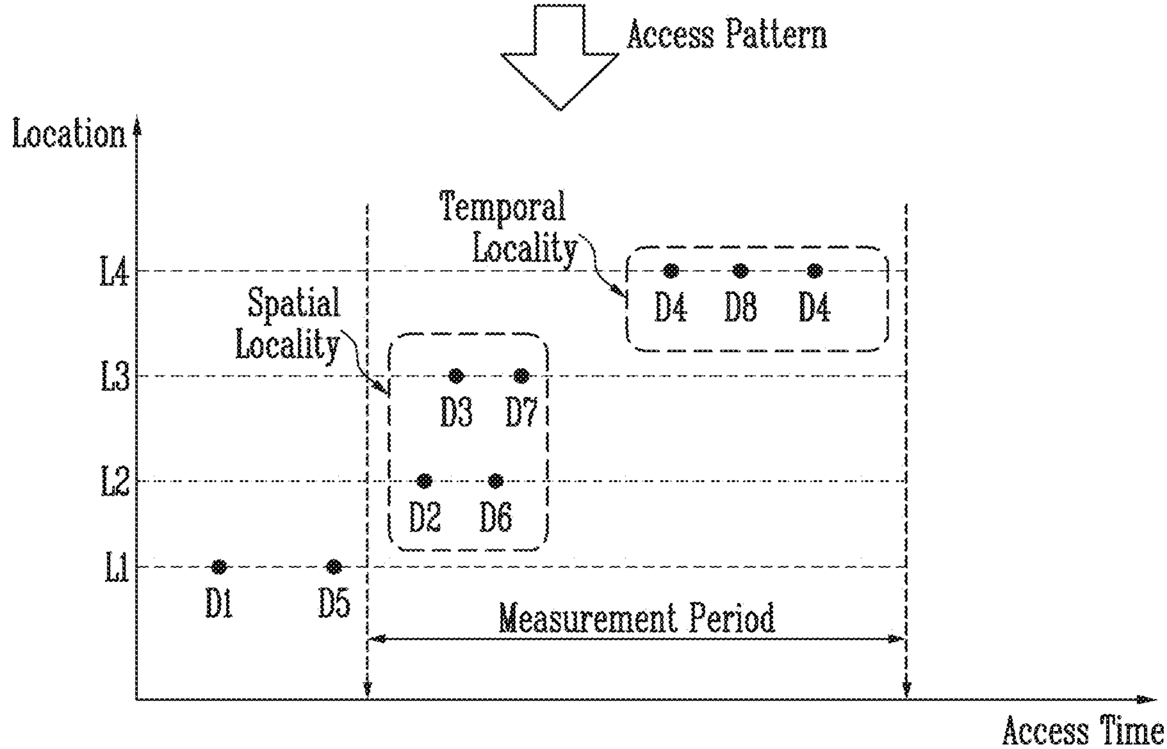

FIG. 3A is a diagram illustrating an access pattern of the host for the data stored in the memory device.

Referring to FIG. 3A, a storage area of the memory device 1200 may be divided into first to fourth locations L1 to L4 according to a location. The number of locations dividing the storage area is not limited to the present embodiment.

First and fifth data D1 and D5 may be stored in the first location L1. Second and sixth data D2 and D6 may be stored in the second location L2. Third and seventh data D3 and D7 may be stored in the third location L3. The fourth and eighth data D4 and D8 may be stored in the fourth location L4.

In FIG. 3A, a graph shows the access pattern for the data stored in the memory device 1200 according to a time and a location.

The data stored in the second to fourth locations L2 to L4 may be accessed during a measurement period. The measurement period may be a time of a preset length. Alternatively, the measurement period may be a period in which a preset number of data is accessed.

The access pattern of the host may be analyzed by a plurality of algorithms. The plurality of algorithms may include spatial locality, temporal locality, branch locality, equidistant locality, sequential locality, and the like. However, an example of the algorithm is not limited to the present embodiment.

The spatial locality indicates a property in which a location close to a recently accessed location is highly likely to be continuously created in the future.

The temporal locality indicates a property in which a recently accessed location is highly likely to be accessed again in the future. The temporal locality may be a case where an expectation access location is the same as a current location, and may be a special case of the spatial locality.

The branch locality indicates a property in which a prediction path is limited to a few small possibility set in a space-time coordinate system.

The equidistant locality indicates a property in which a location having an equidistant pattern is highly likely to be accessed as an intermediate between the spatial locality and the branch locality. For example, an expectation access location in the near future in a space-time coordinate system may be determined as a simple linear function.

The sequential locality indicates a property in which data is highly likely to be sequentially withdrawn and accessed in an order in which data in which a branch does not exist is stored.

In FIG. 3A, the access pattern of the host may be analyzed through a spatial locality algorithm and a temporal locality algorithm.

During the measurement period, the second and sixth data D2 and D6 stored in the second location L2 and the third and seventh data D3 and D7 stored in the third location L3 may have the spatial locality. In other words, since the second location L2 and the third location L3 are close locations, when data stored in any one of the two locations is accessed, data stored in the other location is highly likely to be accessed in the future.

During the measurement period, the fourth and eighth data D4 and D8 stored in the fourth location L4 may have the temporal locality. In other words, the data stored in the fourth location L4, which is the same location as a recently accessed location, is highly likely to be accessed in the future.

FIG. 3B is a diagram illustrating the prefetch table.

Referring to FIGS. 3A and 3B, the prefetch table may indicate the prefetch priority of the candidate data to be prefetched among the data stored in the memory device. The prefetch priority of the candidate data may be calculated based on host access pattern information and a plurality of algorithms.

In FIG. 3B, the prefetch priority of the candidate data may be calculated based on the spatial locality algorithm and the temporal locality algorithm among the plurality of algorithms. The number and a type of algorithms used for calculating the prefetch priority are not limited to the present embodiment.

From a spatial locality point of view, a score may be calculated to be higher in an order of a position close to the recently accessed fourth location L4. Therefore, scores of 3, 2, and 1 may be calculated in an order of the third location L3, the second location L2, and the first location L1. An allocation score and a weight for each location may be variously set.

From a temporal locality point of view, the recently accessed fourth location L4 is highly likely to be accessed again. Assuming that the score is calculated based on the number of data accessed during the measurement period, the score of the fourth location L4 accessed three times may be calculated as 4 points, the second and third locations L2 and L3 accessed twice may be calculated as 1 point, and a score of the first location L1 accessed 0 times may be calculated as 0 points. An allocation score and a weight according to a frequency of access during the measurement period may be variously set.

An overall locality may be calculated by considering both of the spatial locality and the temporal locality. In FIG. 3B, a score obtained by adding scores according to each locality may be a comprehensive locality score. However, a criteria for calculating the score according to each locality and a weight of each locality are not limited to the present embodiment.

When the prefetch priority of the candidate data is calculated according to the overall locality, the prefetch priority may be higher in an order of the data stored in the third location L3, the data stored in the fourth location L4, the data stored in the second location L2, and the data stored in the first location L1.

In an embodiment, the data stored in the third location L3 of which the priority is highest may be selected as the target data to be prefetched into the cache memory. In another embodiment, two data in an order of the priority, that is, the data stored in the third and fourth locations L3 and L4 may be selected as the target data.

Figure 4:
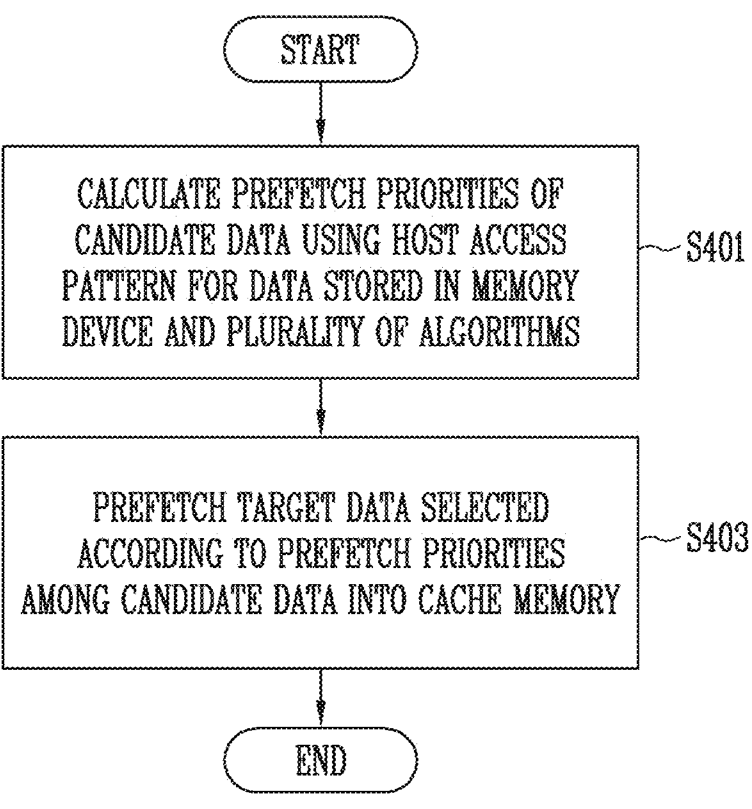
FIG. 4 is a flowchart illustrating an operation of a memory module according to an embodiment.

FIG. 4 is a flowchart illustrating an operation of a memory module according to an embodiment.

Referring to FIG. 4, the memory module may communicate with a host through a compute express link (CXL) interface, and may include a memory device and a cache memory.

In step S401, the memory module may calculate a prefetch priority of candidate data to be prefetched among data stored in the memory device using access pattern information of a host for the data stored in the memory device and a plurality of algorithms. The plurality of algorithms may include at least one of a temporal locality algorithm, a spatial locality algorithm, a branch locality algorithm, an equidistant locality algorithm, and a sequential locality algorithm.

In step S403, the memory module may prefetch target data selected according to the prefetch priority among the candidate data into the cache memory.

Figure 5:
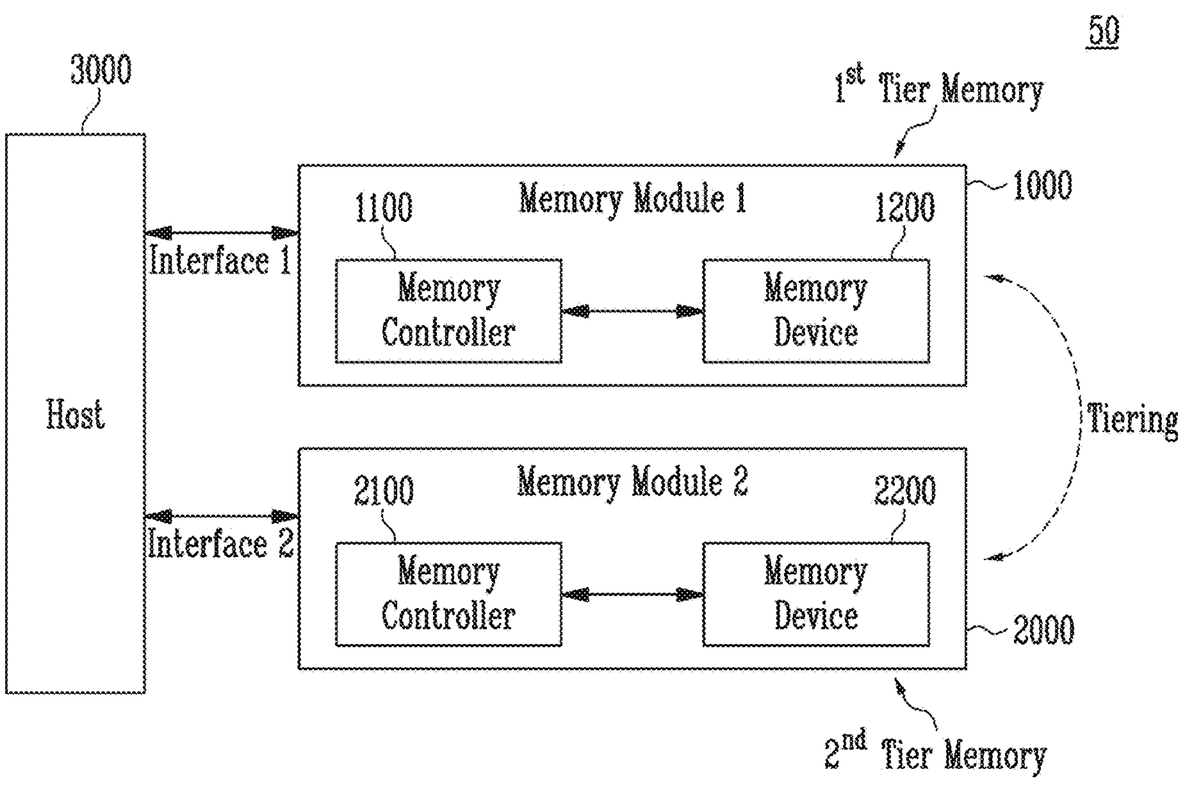
FIG. 5 is a diagram illustrating a configuration and an operation of a memory system according to an embodiment.

FIG. 5 is a diagram illustrating a configuration and an operation of a memory system according to an embodiment.

Referring to FIG. 5, the memory system 50 may include a first memory module 1000, a second memory module 2000, and a host 3000. The number of memory modules included in the memory system 50 is not limited to the present embodiment.

The first memory module 1000 may include a memory device 1200 and a memory controller 1100 controlling the memory device 1200, and may communicate with the host 3000 through a first interface.

The second memory module 2000 may include a memory device 2200 and a memory controller 2100 controlling the memory device 2200, and may communicate with the host 3000 through a second interface.

The first interface and the second interface may be different from each other. The first interface may include a dual in-line memory module (DIMM) interface, and the second interface may include a compute express link (CXL) interface.

In FIG. 5, the first memory module 1000 may be a first tier memory, and the second memory module 2000 may be a second tier memory. The second tier memory may be a memory of which a priority is lower than that of the first tier memory when the host 3000 requests an access.

The host 3000 first requests necessary data to the first tier memory, and requests the data to the second tier memory when the data does not exist in the first tier memory. When the data requested by the host 3000 is stored in the memory, it may be a cache hit, and when the data requested by the host 3000 is not stored in the memory, it may be a cache miss.

Figure 6:
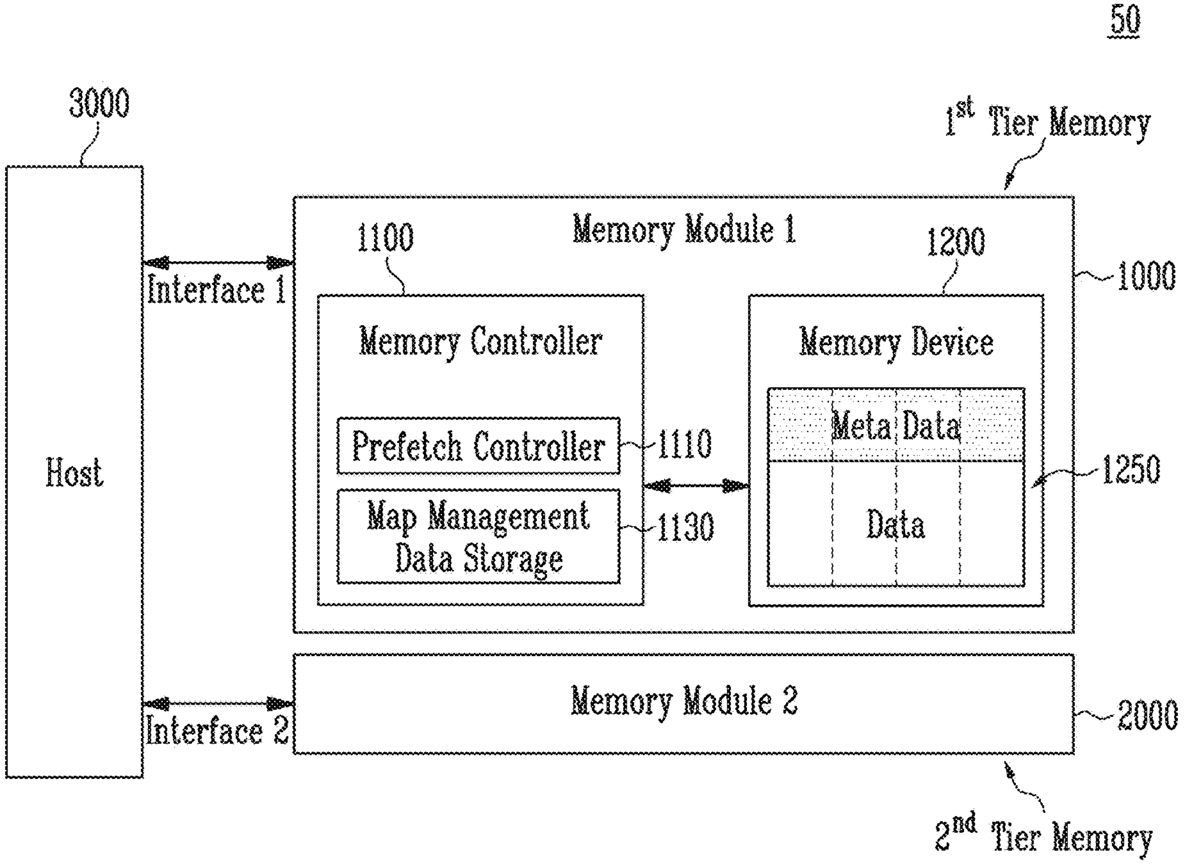
FIG. 6 is a diagram illustrating a configuration and an operation of a memory system according to an embodiment.

FIG. 6 is a diagram illustrating a configuration and an operation of a memory system according to an embodiment.

Referring to FIG. 6, the first memory module 1000 may include a memory controller 1100 and a memory device 1200.

The memory controller 1100 may include a prefetch controller 1110 and a map management data storage 1130.

The prefetch controller 1110 may select target data to be prefetched into the first memory module 1000 from among data stored in the second memory module 2000 based on access pattern information of a host 3000 and a plurality of algorithms.

The prefetch controller 1110 may include a plurality of prefetchers corresponding to a plurality of respective zones 1250. Each of the plurality of prefetchers may select target data using at least one of the plurality of algorithms. The plurality of algorithms may include at least one of a temporal locality algorithm, a spatial locality algorithm, a branch locality algorithm, an equidistant locality algorithm, and a sequential locality algorithm.

The prefetch controller 1110 may prefetch candidate data selected from the data stored in the second memory module 2000 into a plurality of zones included in the first memory module 1000 for each zone. In various embodiments, the prefetch controller 1110 may determine the candidate data among the data stored in the second memory module 2000, and prefetch the target data selected from among the candidate data according to a prefetch priority into the plurality of zones included in the first memory module 1000 for each zone.

The map management data storage 1130 may store the access pattern information of the host 3000 for the data stored in the memory device 1200.

The memory device 1200 may include the plurality of zones 1250 allocated by the host 3000. The plurality of zones 1250 may be a storage area allocated in the memory device 1200 according to a core, a thread, or an application of the host 3000. Each of the plurality of zones 1250 may separately store the target data and meta data of the target data for each zone.

Figure 7:
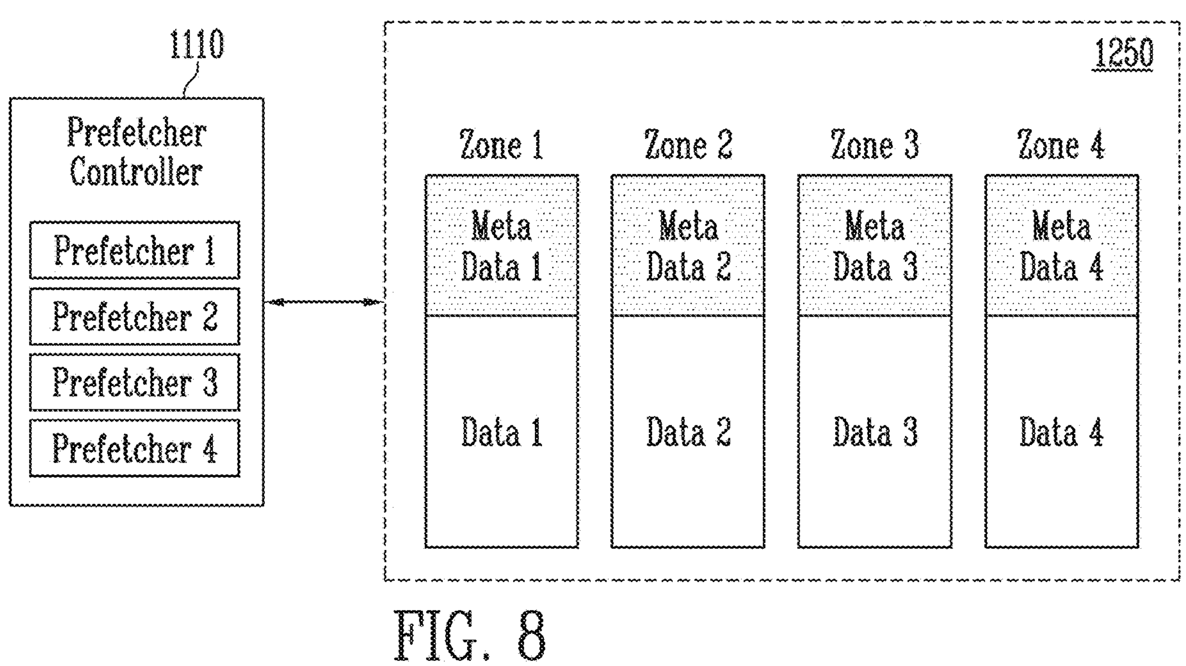
FIG. 7 is a diagram illustrating an operation of a prefetcher controller of FIG. 6.

FIG. 7 is a diagram illustrating an operation of the prefetcher controller of FIG. 6.

Referring to FIGS. 6 and 7, the prefetch controller 1110 may include the plurality of prefetchers corresponding to the plurality of respective zones 1250. Each of the plurality of prefetchers may select the candidate data using at least one of the plurality of algorithms. The plurality of algorithms may include at least one of the temporal locality algorithm, the spatial locality algorithm, the branch locality algorithm, the equidistant locality algorithm, and the sequential locality algorithm.

For example, the plurality of zones 1250 may include first to fourth zones. First to fourth prefetchers may correspond to the first to fourth zones, respectively.

The first prefetcher may select first candidate data to be prefetched into the first zone among the data stored in the second memory module 2000, by using a first algorithm among the plurality of algorithms based on the access pattern of the host for first data stored in the first zone. At this time, the first candidate data may be data stored in the second module 2000, but may be data that is highly likely to be accessed like the first data as a result of analyzing the host access pattern for the first data using the first algorithm.

The second prefetcher may select second candidate data to be prefetched into the second zone among the data stored in the second memory module 2000, by using a second algorithm among the plurality of algorithms based on the access pattern of the host for second data stored in the second zone. The third prefetcher may select fourth candidate data to be prefetched into the third zone among the data stored in the second memory module 2000, by using a third algorithm among the plurality of algorithms based on the access pattern of the host for third data stored in the third zone. The fourth prefetcher may select fourth candidate data to be prefetched into the fourth zone among the data stored in the second memory module 2000, by using a fourth algorithm among the plurality of algorithms based on the access pattern of the host for fourth data stored in the fourth zone.

In an embodiment, the first to fourth candidate data selected by the first to fourth prefetchers among the data stored in the second memory module 2000 may be prefetched into each zone. In another embodiment, the first to fourth candidate data may be selected by the first to fourth prefetchers among the data stored in the second memory module 2000, and the target data selected by the prefetch priority among the first to fourth candidate data may be prefetched into a corresponding zone.

Figure 8:
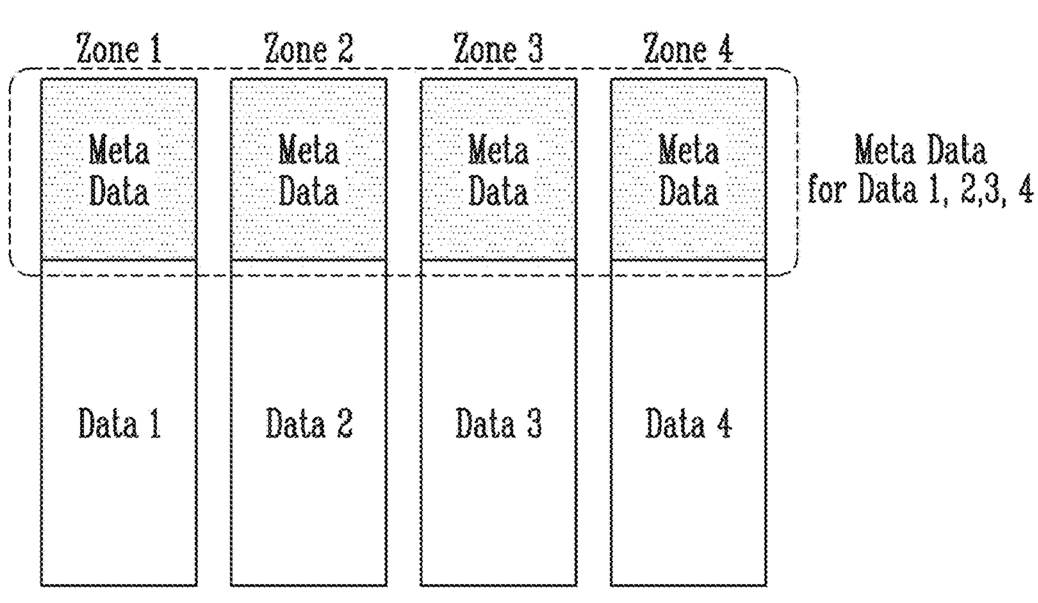
FIG. 8 is a diagram illustrating a method of storing data and meta data according to an embodiment.

FIG. 8 is a diagram illustrating a method of storing data and meta data according to an embodiment.

Referring to FIG. 8, the plurality of zones 1250 may include the first to fourth zones.

In FIG. 7, the first to fourth zones may store first to fourth meta data for the respective first to fourth data, which are stored in each zone, for each zone.

In FIG. 8, the first to fourth zones may share and store the meta data for all of the first to fourth data stored in each zone.

Figure 9:
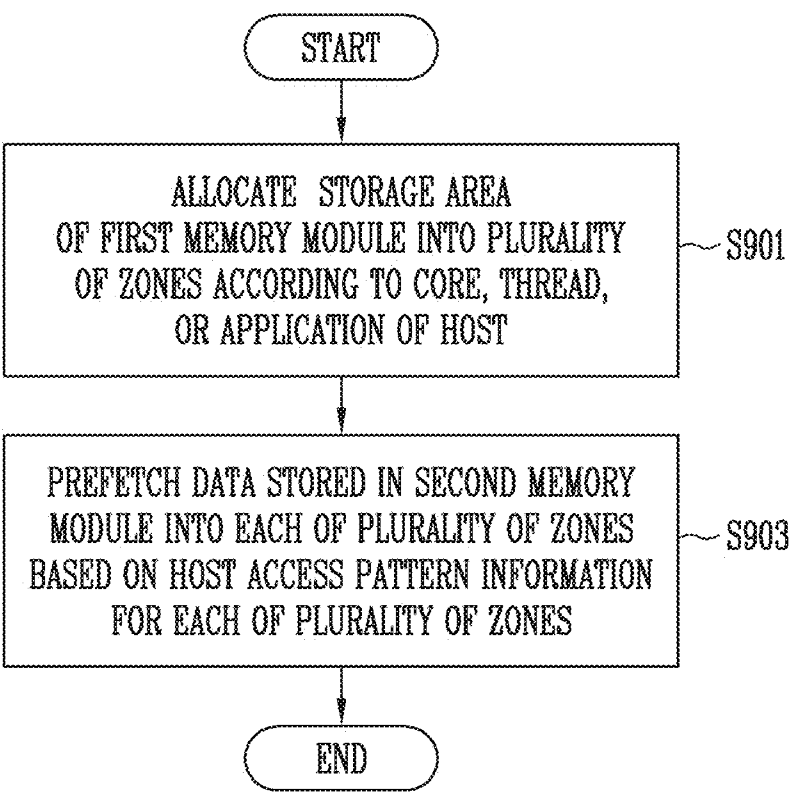
FIG. 9 is a flowchart illustrating an operation of a memory module according to an embodiment.

FIG. 9 is a flowchart illustrating an operation of a memory module according to an embodiment.

Referring to FIG. 9, in step S901, the memory system may allocate the storage area of the first memory module communicating with the host through the first interface to a plurality of zones according to a core, a thread, or an application of the host.

In step S903, the memory system may prefetch the data stored in the second memory module into each of the plurality of zones, based on the access pattern information of the host for each of the zones included in the first memory module.

Figure 10:
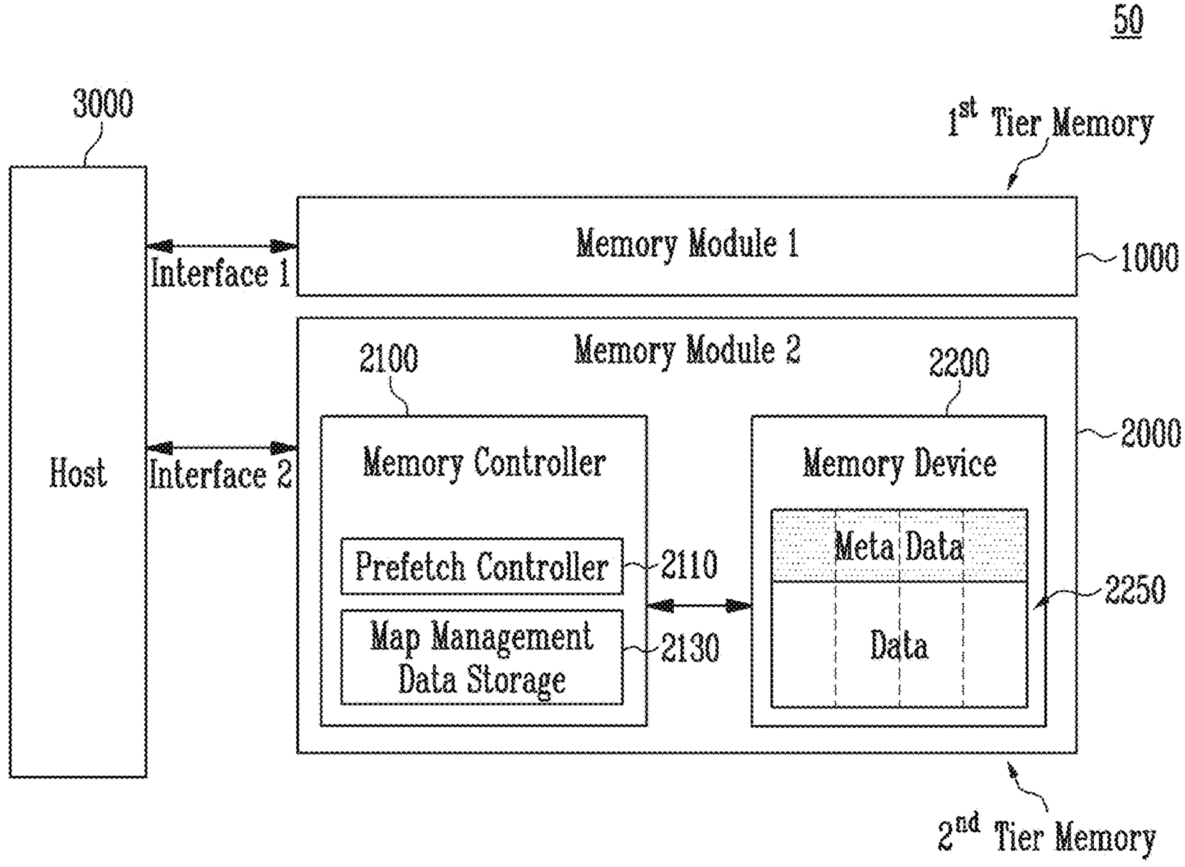
FIG. 10 is a diagram illustrating a configuration and an operation of a memory module according to an embodiment.

FIG. 10 is a diagram illustrating a configuration and an operation of a memory module according to an embodiment.

Referring to FIG. 10, the memory system 50 may include a first memory module 1000, a second memory module 2000, and a host 3000. The first memory module 1000 may communicate with the host 3000 through a first interface, and the second memory module 2000 may communicate with the host 3000 through a second interface. The first interface and the second interface may be different from each other. The first interface may include a dual in-line memory module (DIMM) interface, and the second interface may include a compute express link (CXL) interface. The second memory module 2000 may have a tier lower than that of the first memory module 1000 in an access request of the host 3000.

The second memory module 2000 may include a memory controller 2100 and a memory device 2200.

The memory controller 2100 may include a prefetch controller 2110 and a map management data storage 2130.

The prefetch controller 2110 may select target data to be prefetched into the first memory module 1000 among data stored in a plurality of zones 2250, based on access pattern information of the host 3000 for the plurality of zones 2250 and a plurality of algorithms.

The prefetch controller 2110 may include a plurality of prefetchers corresponding to the plurality of respective zones 2250. Each of the plurality of prefetchers may select the target data using at least one of the plurality of algorithms. The plurality of algorithms may include at least one of a temporal locality algorithm, a spatial locality algorithm, a branch locality algorithm, an equidistant locality algorithm, and a sequential locality algorithm.

The prefetch controller 2110 may provide the target data selected from the data stored in the plurality of zones 2250 to the first memory module 1000. In various embodiments, the prefetch controller 1110 may provide the target data selected for each of the plurality of zones 2250 to the first memory module 1000.

The map management data storage 2130 may store the access pattern information of the host 3000 for the data stored in the memory device 2200.

The memory device 2200 may include the plurality of zones 2250 allocated by the host 3000. The plurality of zones 2250 may be a storage area allocated in the memory device 2200 according to a core, a thread, or an application of the host 3000. Each of the plurality of zones 2250 may separately store the target data and meta data of the target data for each zone.

Figure 11:
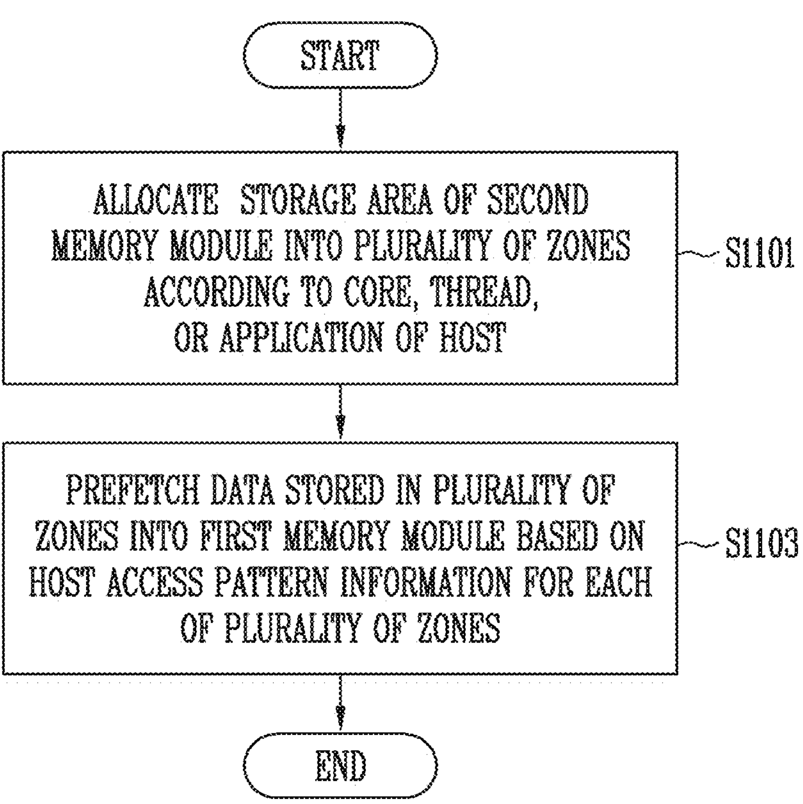
FIG. 11 is a flowchart illustrating an operation of a memory module according to an embodiment.

FIG. 11 is a flowchart illustrating an operation of a memory module according to an embodiment.

Referring to FIG. 11, a first memory module may communicate with a host through a first interface and a second memory module may communicate with the host through a second interface.

In step S1101, a memory system may allocate a storage area of the host and the second memory module to a plurality of zones according to a core, a thread, or an application of the host.

In step S1103, the memory system may prefetch data stored in the second memory module into the first memory module, based on access pattern information of the host for each of the plurality of zones. Specifically, the memory system may provide target data to be prefetched among data stored in the plurality of zones included in the second memory module into the first memory module.

Figure 12:
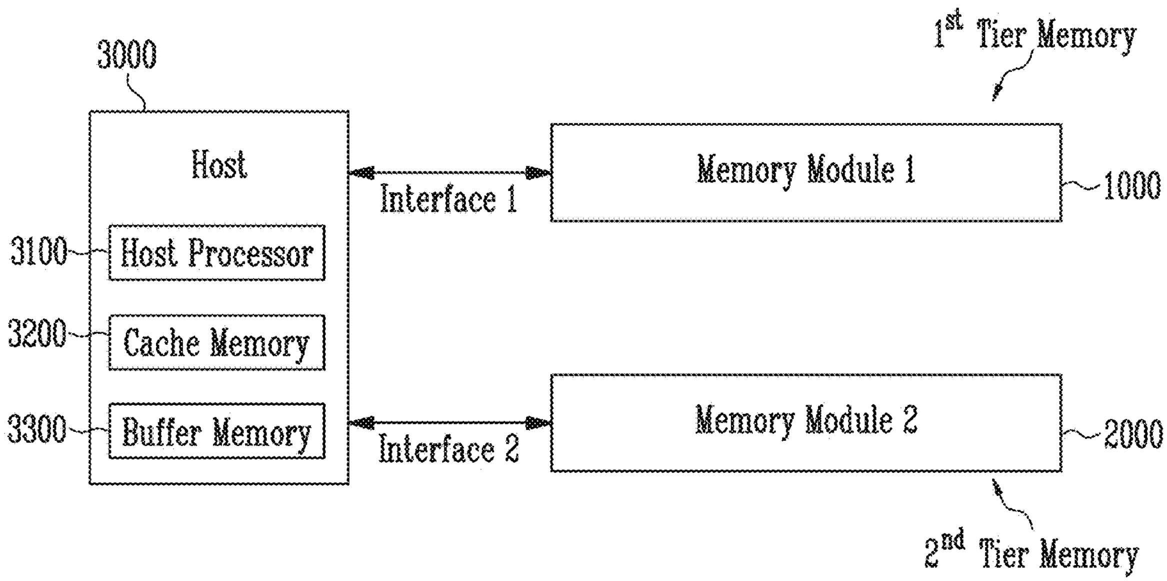
FIG. 12 is a diagram illustrating a configuration and an operation of a memory system according to an embodiment.

FIG. 12 is a diagram illustrating a configuration and an operation of a memory system according to an embodiment.

Referring to FIG. 12, the memory system 50 may include a first memory module 1000, a second memory module 2000, and a host 3000. The first memory module 1000 may communicate with the host 3000 through a first interface, and the second memory module 2000 may communicate with the host 3000 through a second interface. The first interface and the second interface may be different from each other.

A communication interface between the host 3000 and the memory module may include at least one of a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The host 3000 may include a host processor 3100, a cache memory 3200, and a buffer memory 3300.

The host processor 3100 may control an overall operation of the host 3000. The host processor 3100 may communicate with the first and second memory modules 1000 and 2000 to transmit and receive data. The host processor 3100 may provide an address or data together with a request to the first and second memory modules 1000 and 2000.

The cache memory 3200 may be a memory used to reduce a bottleneck according to a speed difference between the host processor 3100 and the first and second memory modules 1000 and 2000.

The buffer memory 3300 may be a memory having a lower priority (that is, a lower tier) than the cache memory 3200 when during access of the host processor 3100.

In FIG. 12, the first memory module 1000 may be a first tier memory of which a priority is higher than that of the second memory module 2000 in an access request of the host 3000. The second memory module 2000 may be a second tier memory having a priority lower than that of the first tier memory.

In this case, the host 3000 first requests necessary data to the first tier memory, and requests the data to the second tier memory when the data does not exist in the first tier memory. When the data requested by the host 3000 is stored in a target memory, it may be a cache hit, and when the data requested by the host 3000 is not stored in the target memory, it may be a cache miss.

Figure 13:
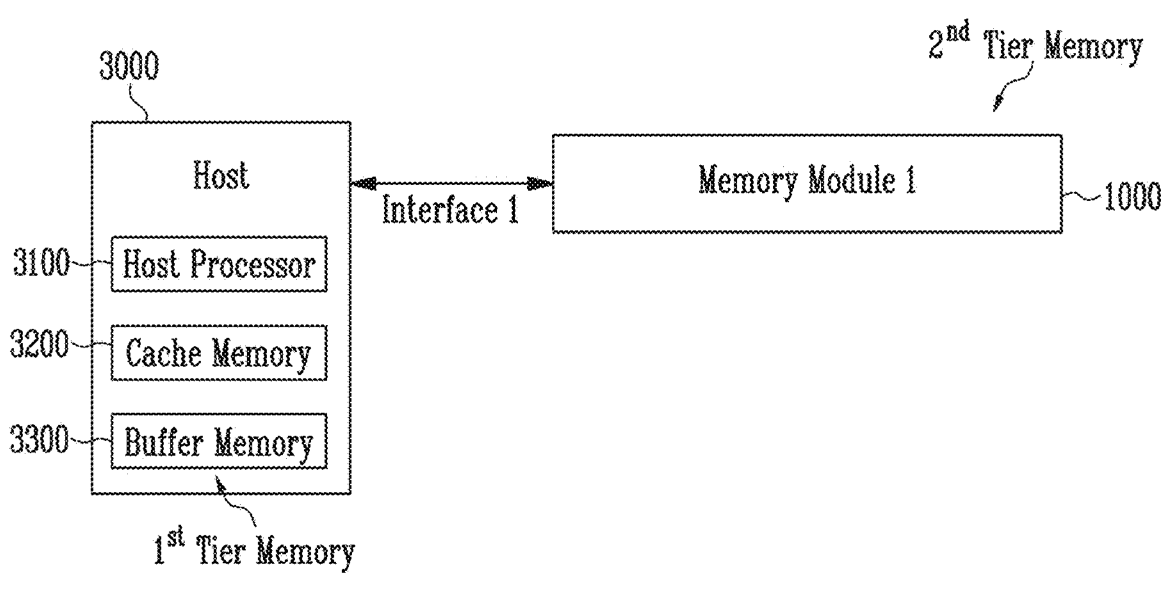
FIG. 13 is a diagram illustrating a configuration and an operation of a memory system according to an embodiment.

FIG. 13 is a diagram illustrating a configuration and an operation of a memory system according to an embodiment.

Referring to FIG. 13, the memory system 50 may include a first memory module 1000 and a host 3000. The first memory module 1000 may communicate with the host 3000 through a first interface. The first interface may include a dual in-line memory module (DIMM) interface.

The host 3000 may include a host processor 3100, a cache memory 3200, and a buffer memory 3300.

In FIG. 13, the buffer memory 3300 may be a first tier memory of which a priority is higher than that of the first memory module 1000 in an access request of the host processor 3100. The first memory module 1000 may be a second tier memory of which a priority is lower than that of the first tier memory.

In this case, the host processor 3100 first requests necessary data to the buffer memory 3300 that is the first tier memory, and requests the data to the first memory module 1000 that is the second tier memory when requested data does not exist in the buffer memory 3300.

Figure 14:
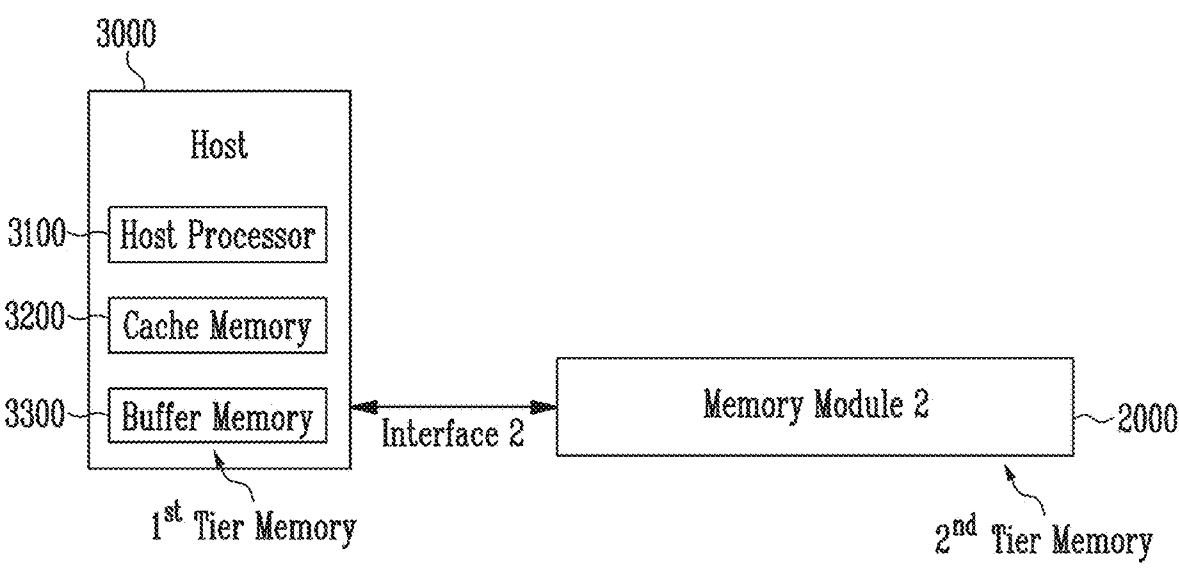
FIG. 14 is a diagram illustrating a configuration and an operation of a memory system according to an embodiment.

FIG. 14 is a diagram illustrating a configuration and an operation of a memory system according to an embodiment.

Referring to FIG. 14, the memory system 50 may include a second memory module 2000 and a host 3000. The second memory module 2000 may communicate with the host 3000 through a second interface. The second interface may include a compute express line (CXL) interface.

The host 3000 may include a host processor 3100, a cache memory 3200, and a buffer memory 3300.

In FIG. 14, the buffer memory 3300 may be a first tier memory of which a priority is higher than that of the second memory module 2000 in an access request of the host processor 3100. The second memory module 2000 may be a second tier memory of which a priority is lower than that of the first tier memory.

In this case, the host processor 3100 first requests necessary data to the buffer memory 3300 that is the first tier memory, and requests the data to the second memory module 2000 that is the second tier memory when requested data does not exist in the buffer memory 3300.

Figure 15:
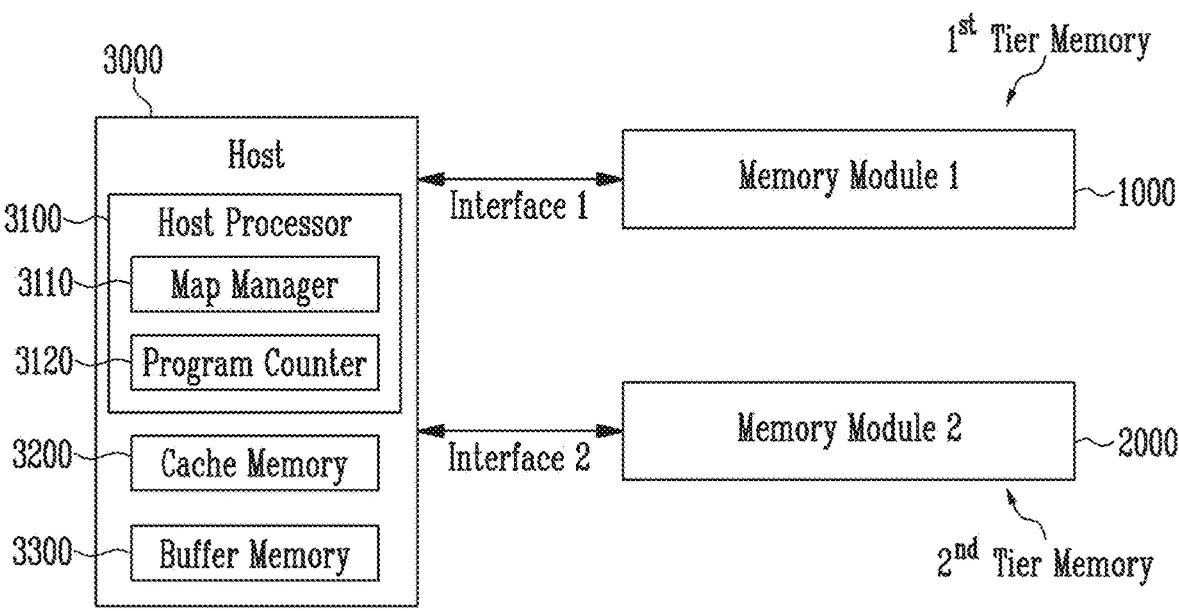
FIG. 15 is a diagram illustrating a configuration and an operation of a memory system according to an embodiment.

FIG. 15 is a diagram illustrating a configuration and an operation of a memory system according to an embodiment.

Referring to FIG. 15, the memory system 50 may include a first memory module 1000, a second memory module 2000, and a host 3000.

The first memory module 1000 may communicate with the host 3000 through a first interface, and the second memory module 2000 may communicate with the host 3000 through a second interface. The first interface and the second interface may be different from each other. The first interface may include a dual in-line memory module (DIMM) interface. The second interface may include a compute express line (CXL) interface.

In FIG. 15, the first memory module 1000 may be a first tier memory of which a priority is higher than that of the second memory module 2000 in an access request of the host 3000. The second memory module 2000 may be a second tier memory of which a tier is lower than that of the first tier memory.

In another embodiment, the first tier memory may be a buffer memory 3300 and the second tier memory may be the first memory module 1000. In another embodiment, the first tier memory may be the buffer memory 3300 and the second tier memory may be the second memory module 2000.

The host 3000 may include a host processor 3100, a cache memory 3200, and a buffer memory 3300.

The host processor 3100 may determine target data to be prefetched from the second tier memory to the first tier memory, based on an address of a cache missed request from the cache memory 3200 and program counter information.

The host processor 3100 may include a map manager 3110 and a program counter 3120.

The map manager 3110 may determine data predicted to be accessed in the future as the target data based on the address of the cache missed request from the cache memory 3200 and the program counter information. The map manager 3110 may classify the address of the cache missed request for each program counter, and predict the target data based on a classified data pattern.

For example, an order of the addresses of the cache missed request may be '1, 2, 20, 25, 3, and 30'. Among these, a request by a first program counter may be arranged as '1, 2, and 3', and a request by a second program counter may be arranged as '20, 25, and 30'. Therefore, an address of the target data to be requested to be accessed in the future may be predicted as 4 or 35.

According to whether the target data is stored in the first tier memory, the map manager 3110 may adjust an eviction priority of the target data from the first tier memory or prefetch the target data from the second tier memory to the first tier When the target data is stored in the first tier memory, the map manager 3110 may adjust the eviction priority of the target data. The map manager 3110 may lower the eviction priority of the target data from the first tier memory. When the target data is not stored in the first tier memory, the map manager 3110 may receive the target data from the second tier memory. The map manager 3110 may prefetch the received target data into the first tier memory.

The program counter 3120 may generate the program counter information indicating an address of an instruction to be executed next to the cache missed request.

Figure 16:
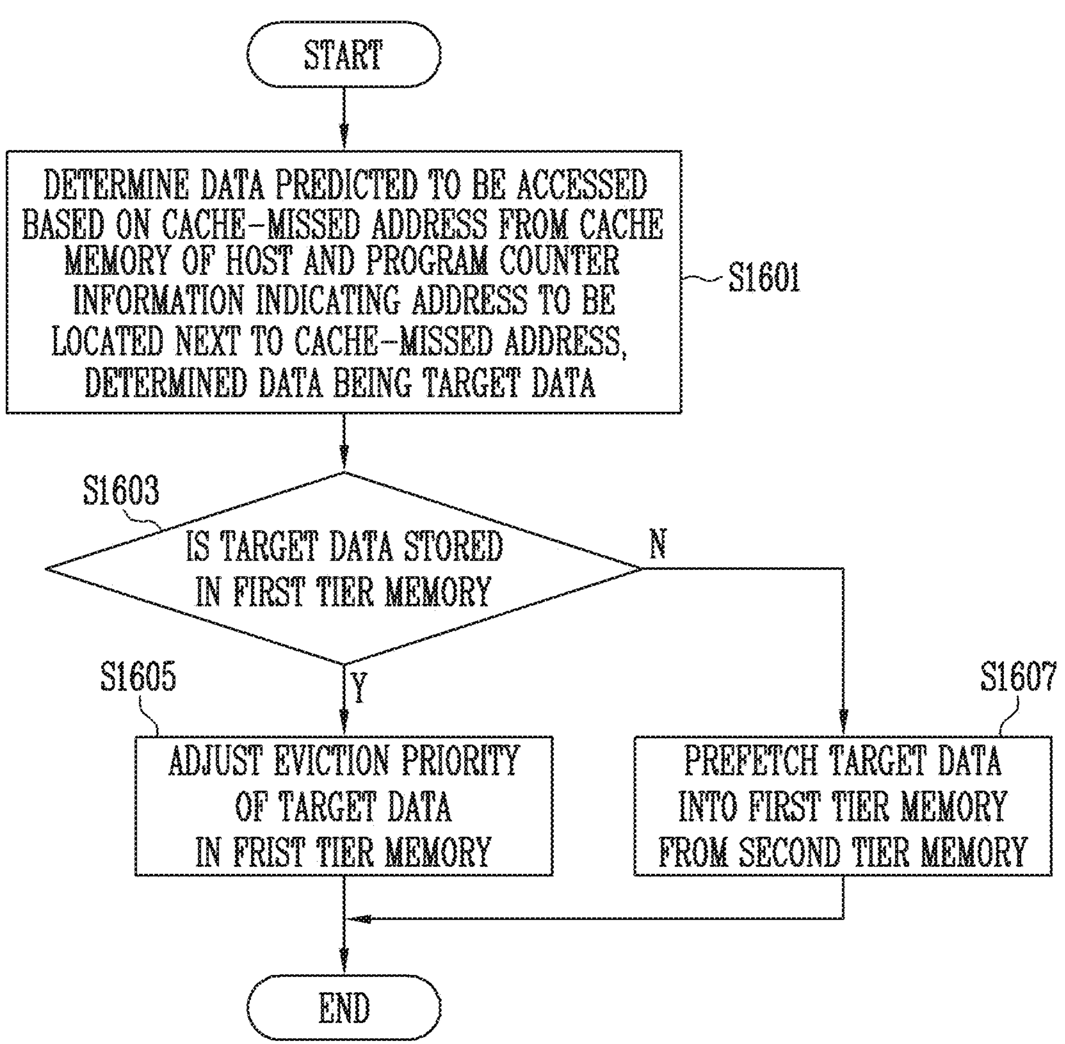
FIG. 16 is a flowchart illustrating an operation of a memory system according to an embodiment.

FIG. 16 is a flowchart illustrating an operation of a memory system according to an embodiment.

Referring to FIG. 16, the memory system may include a first tier memory and a second tier memory.

In an embodiment, the first tier memory may be a first memory module communicating with a host through a first interface, and the second tier memory may be a second memory module communicating with the host through a second interface. In an embodiment, the first tier memory may be a buffer memory of the host and the second tier memory may be a first memory module communicating with the host through the first interface. In an embodiment, the first tier memory may be the buffer memory of the host and the second tier memory may be the second memory module communicating with the host through the second interface.

The first interface and the second interface may be different from each other. The first interface may include a dual in-line memory module (DIMM) interface. The second interface may include a compute express line (CXL) interface.

In step S1601, the memory system may determine data predicted to be accessed based on program counter information indicating an address of a cache missed request from a cache memory of a host and an address of an instruction to be executed next to the cache missed request as target data.

In step S1603, the memory system may determine whether the target data is stored in the first tier memory. As a result of the determination, when the target data is stored in the first tier memory (cache hit), the operation proceeds to step S1605. When the target data is not stored in the first tier memory (cache miss), the operation proceeds to step S1607.

In step S1605, the memory system may adjust an eviction priority of the target data from the first tier memory. Specifically, the memory system may lower the eviction priority of the target data from the first tier memory.

In step S1607, the memory system may prefetch the target data stored in the second tier memory into the first tier memory.

Figure 17:
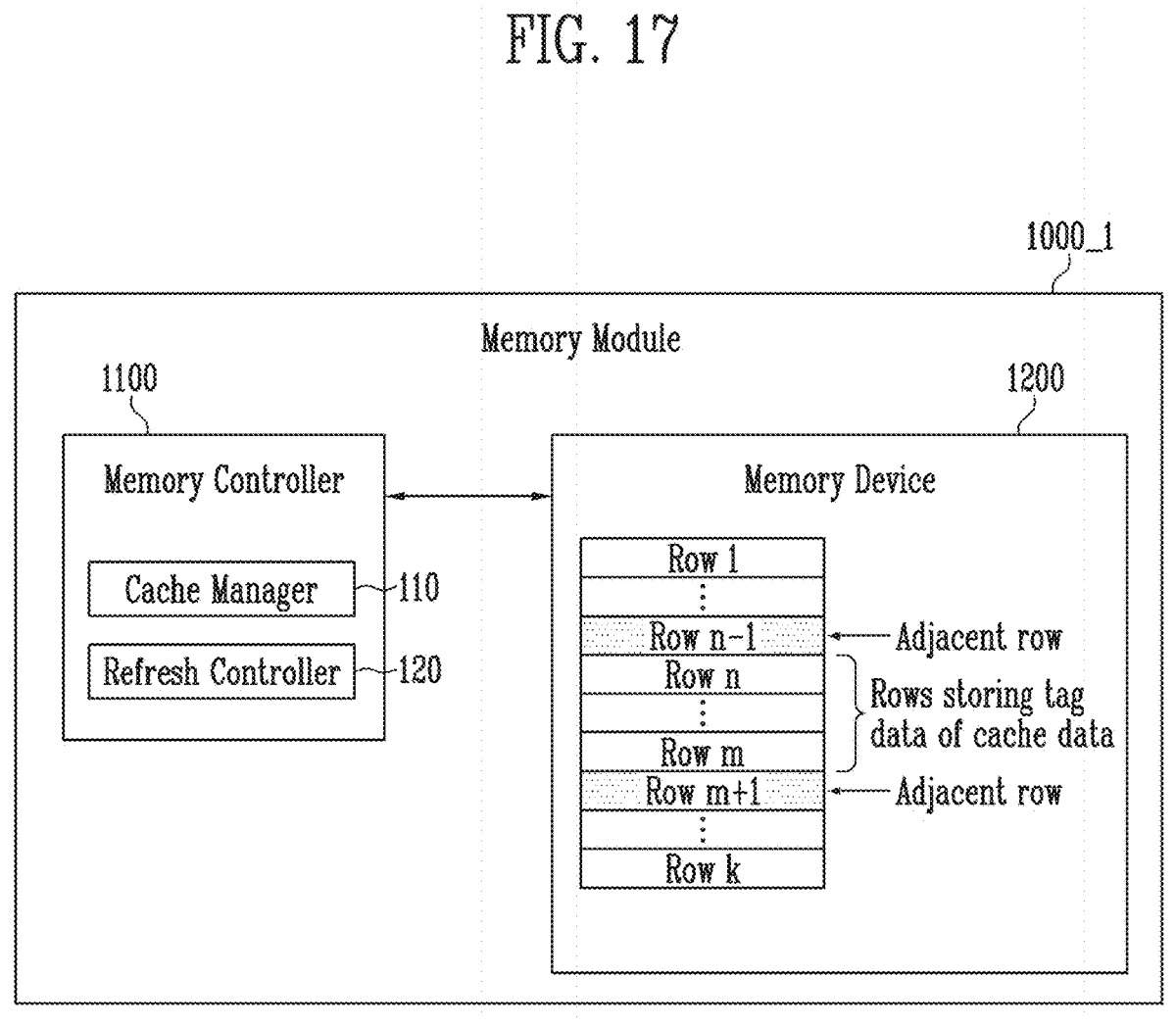

FIG. 17 is a diagram illustrating a configuration and an operation of a memory module according to an embodiment.

Referring to FIG. 17, the memory module 1000_1 may include a memory controller 1100 and a memory device 1200.

The memory device 1200 may include a plurality of rows. Each row may store cache data and tag data indicating a location of the cache data. The memory device 1200 may include a random access memory configured of the plurality of rows.

The memory controller 1100 may include a cache manager 110 and a refresh controller 120.

The cache manager 110 may set rows in which a hammer count in which a bit flip occurs is lower than a threshold value among the plurality of rows as target rows. The cache manager 110 may set the target rows based on row management information indicating rows of which a physical characteristic is weak among the plurality of rows. The row management information may be obtained through a test result in a manufacturing process step or manufacturer information.

The cache manager 110 may store tag group data obtained by collecting the tag data in the target rows among the plurality of rows. The target rows may be rows of which a physical characteristic is weak among the plurality of rows. For example, the target rows may be rows in which a hammer count in which a bit flip occurs is lower than a threshold value among the plurality of rows. That is, the target rows may be a row in which a bit flip is highly likely to occur compared to other rows due to a hammering operation in which an adjacent row is accessed.

The refresh controller 120 may perform a refresh operation by applying a voltage to rows adjacent to the target rows among the plurality of rows.

In FIG. 17, the plurality of rows may include first to k-th rows. n-th to m-th rows may be the target rows. An (n−1)-th row and an (m+1)-th row may be the rows adjacent to the target rows.

The target rows may be a row of which a physical characteristic is weak, and a bit flip may easily occur even with a small hammer count. The hammer count may be the number of times a hammering operation is performed on a selected row, and the hammering operation may be an operation of accessing an adjacent row of the selected row. In order to prevent the bit flip, an access operation to the target row is required to be performed.

According to an embodiment of the present disclosure, since the tag data is referenced when searching for cache data and is data of which an access frequency is high, when the tag data is stored in the target rows of which the physical characteristic is weak, a frequency of access to the target rows may increase, and thus the bit flip may be efficiently prevented.

Figure 18:
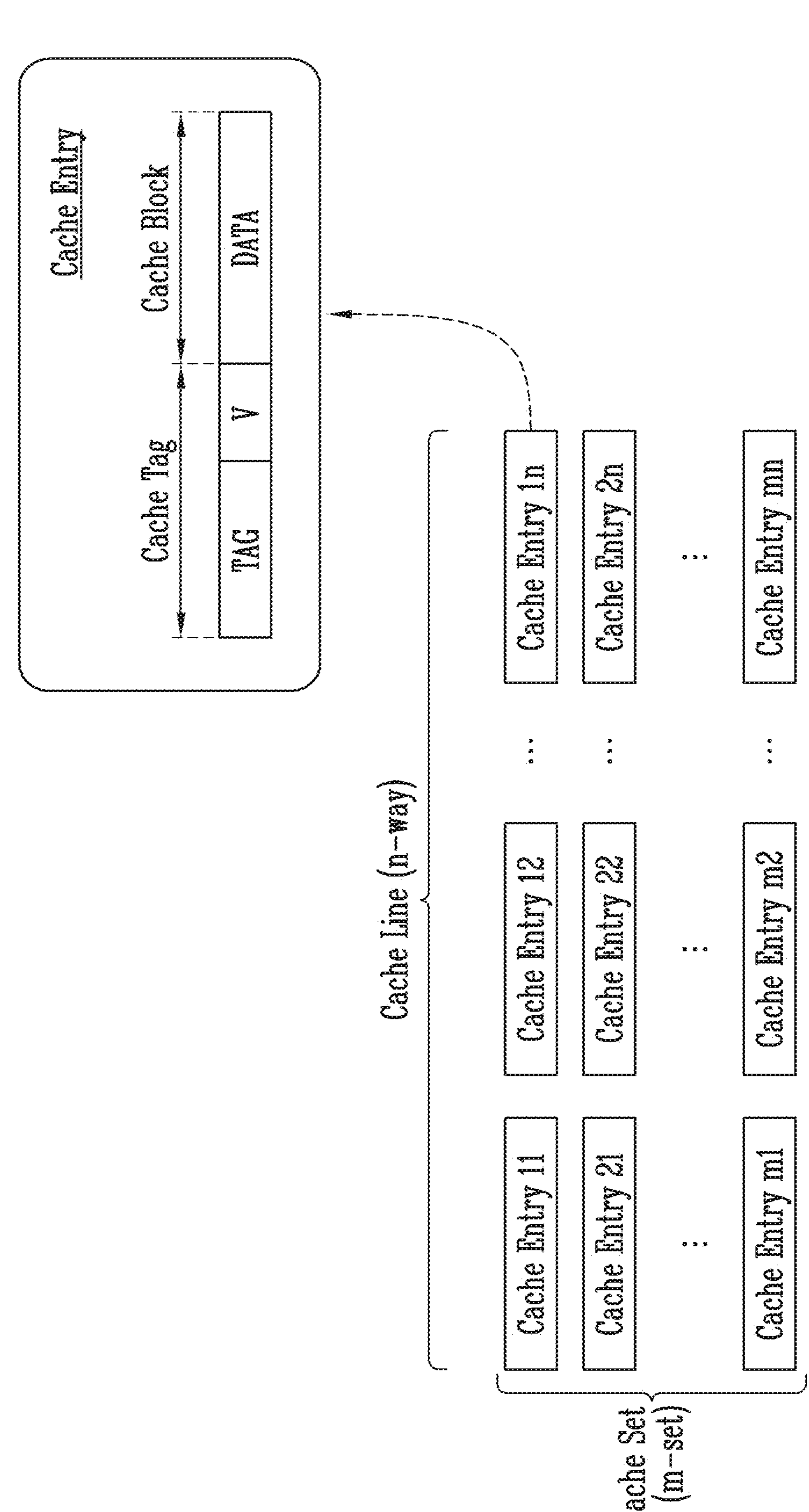
FIG. 18 is a diagram illustrating a configuration of a cache memory.

FIG. 18 is a diagram illustrating a configuration of the cache memory.

Referring to FIG. 18, the cache memory may include a plurality of sets and a plurality of ways. A cache line may be a smallest unit for reading a cache entry from the cache memory.

The cache entry may be divided into a cache block in which cache data is stored, and a cache tag in which tag data and a valid bit are stored. The tag data may be a unique identification value of the cache block, and a processor may access the cache block through a tag data value. The valid bit indicates whether the cache data stored in the cache block is valid.

Figure 19:
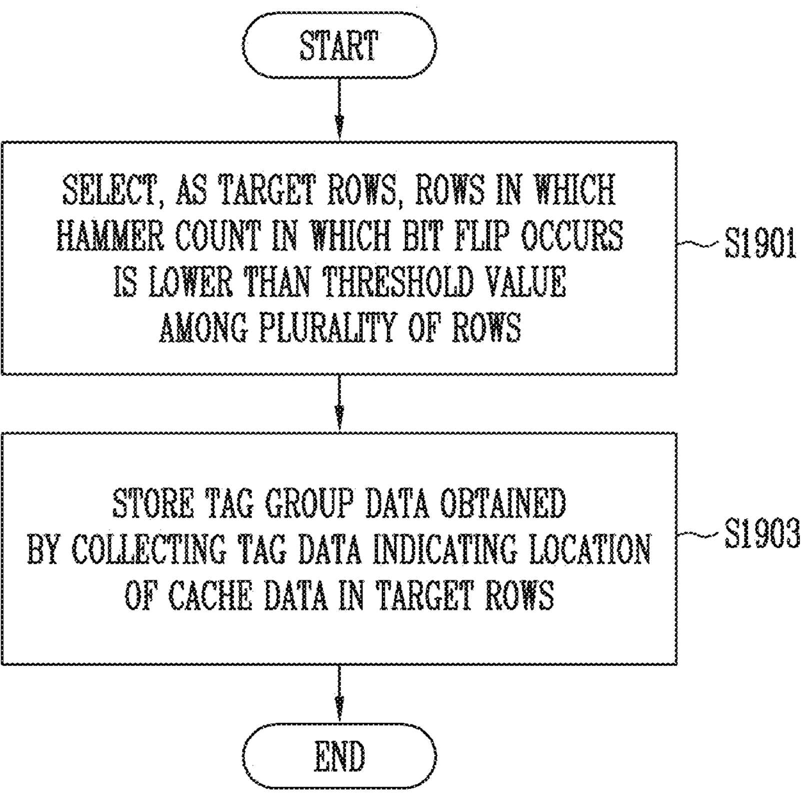
FIG. 19 is a flowchart illustrating an operation of a memory system according to an embodiment.

FIG. 19 is a flowchart illustrating an operation of a memory system according to an embodiment.

Referring to FIG. 19, a memory module may include a plurality of rows.

In step S1901, the memory module may select rows in which a hammer count in which a bit flip occurs is lower than a threshold value among the plurality of rows as target rows.

In step S1903, the memory module may store tag group data obtained by collecting tag data indicating a location of cache data in the target rows.

Figure 20:
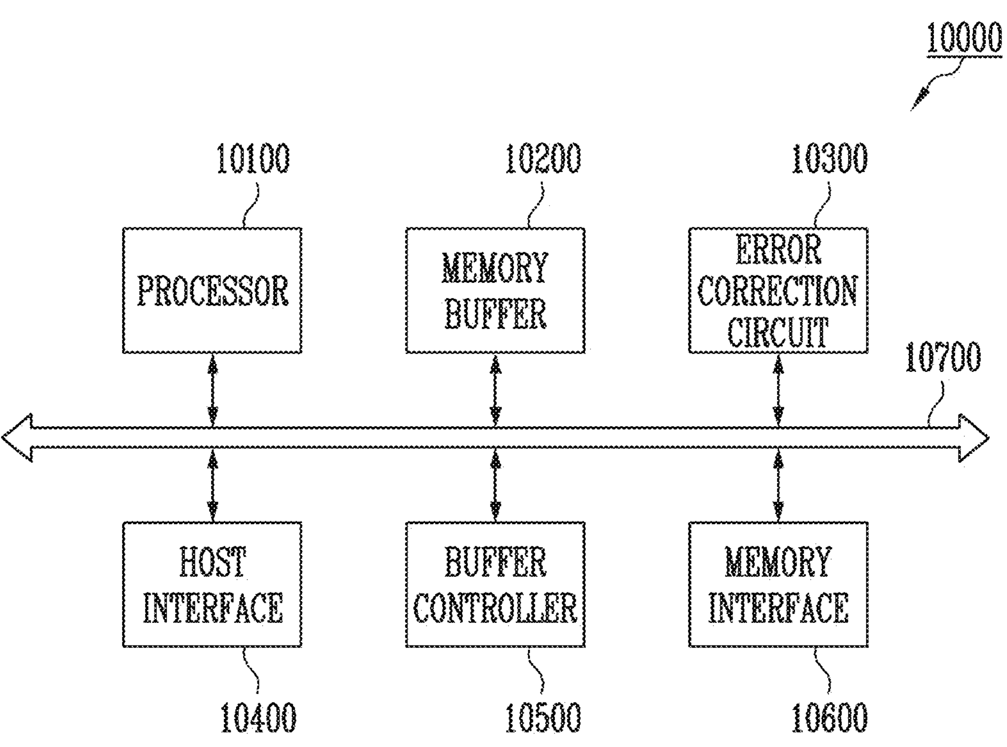
FIG. 20 is a diagram illustrating another embodiment of a memory controller of FIG. 1.

FIG. 20 is a diagram illustrating another embodiment of the memory controller of FIG. 1.

Referring to FIG. 20, the memory controller 10000 is connected to a host and the memory device. The memory controller 10000 is configured to access the memory device in response to a request from the host. For example, the memory controller 10000 is configured to control the write, read, erase, and background operations of the memory device. The memory controller 10000 is configured to provide an interface between the memory device and the host. The memory controller 10000 is configured to drive firmware for controlling the memory device.

The memory controller 10000 may include a processor 10100, a memory buffer 10200, an error correction circuit (ECC) 10300, a host interface 10400, a buffer controller (buffer control circuit) 10500, a memory interface 10600, and a bus 10700.

The bus 10700 may be configured to provide a channel between components of the memory controller 10000.

The processor 10100 may control an overall operation of the memory controller 10000 and may perform a logical operation. The processor 10100 may communicate with an external host through the host interface 10400 and communicate with the memory device through the memory interface 10600. In addition, the processor 10100 may communicate with the memory buffer 10200 through the buffer controller 10500. The processor 10100 may control an operation of the memory module using the memory buffer 10200 as an operation memory, a cache memory, or a buffer memory.

The processor 10100 may perform a function of an FTL. The processor 10100 may convert an LBA provided by the host into a PBA through the FTL. The FTL may receive the LBA using a mapping table and convert the LBA into the PBA. An address mapping method of the flash translation layer may include various methods according to a mapping unit. A representative address mapping method includes a page mapping method, a block mapping method, and a hybrid mapping method.

The processor 10100 is configured to randomize data received from the host. For example, the processor 10100 may randomize the data received from the host using a randomizing seed. The randomized data is provided to the memory device as data to be stored and is programmed to the memory cell array.

The processor 10100 is configured to de-randomize data received from the memory device during the read operation. For example, the processor 10100 may de-randomize the data received from the memory device using a de-randomizing seed. The de-randomized data may be output to the host.

As an embodiment, the processor 10100 may perform the randomization and the de-randomization by driving software or firmware.

The memory buffer 10200 may be used as an operation memory, a cache memory, or a buffer memory of the processor 10100. The memory buffer 10200 may store codes and commands executed by the processor 10100. The memory buffer 10200 may store data processed by the processor 10100. The memory buffer 10200 may include a static RAM (SRAM) or a dynamic RAM (DRAM).

The ECC 10300 may perform error correction. The ECC 10300 may perform error correction encoding (ECC encoding) based on data to be written to the memory device through memory interface 10600. The error correction encoded data may be transferred to the memory device through the memory interface 10600. The ECC 10300 may perform error correction decoding (ECC decoding) on the data received from the memory device through the memory interface 10600. For example, the ECC 10300 may be included in the memory interface 10600 as a component of the memory interface 10600.

The host interface 10400 is configured to communicate with an external host under control of the processor 10100. The host interface 10400 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 10500 is configured to control the memory buffer 10200 under the control of the processor 10100.

The memory interface 10600 is configured to communicate with the memory device under the control of the processor 10100. The memory interface 10600 may communicate a command, an address, and data with the memory device through a channel.

For example, the memory controller 10000 may not include the memory buffer 10200 and the buffer controller 10500. For example, the processor 10100 may control the operation of the memory controller 10000 using codes. The processor 10100 may load the codes from a nonvolatile memory device (for example, a read only memory) provided inside the memory controller 10000. As another example, the processor 10100 may load the codes from the memory device through the memory interface 10600.

For example, the bus 10700 of the memory controller 10000 may be divided into a control bus and a data bus. The data bus may be configured to transmit data within the memory controller 10000 and the control bus may be configured to transmit control information such as a command and an address within the memory controller 10000. The data bus and the control bus may be separated from each other and may not interfere with each other or affect each other. The data bus may be connected to the host interface 10400, the buffer controller 10500, the ECC 10300, and the memory interface 10600. The control bus may be connected to the host interface 10400, the processor 10100, the buffer controller 10500, the memory buffer 1202, and the memory interface 10600.

Figure 21:
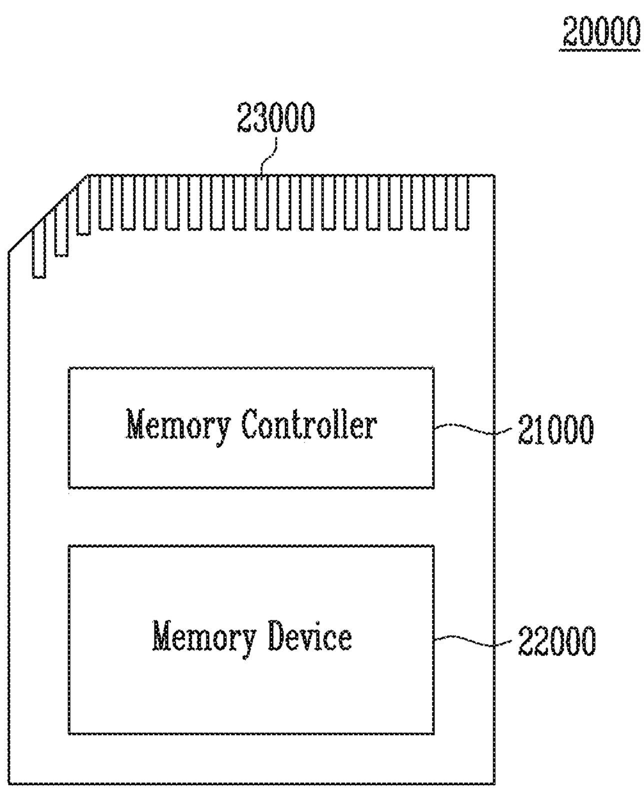
FIG. 21 is a block diagram illustrating a memory card system to which a memory module according to an embodiment of the present disclosure is applied.

FIG. 21 is a block diagram illustrating a memory card system to which a memory module according to an embodiment of the present disclosure is applied.

Referring to FIG. 21, the memory card system 20000 includes a memory controller 21000, a memory device 22000, and a connector 23000.

The memory controller 21000 is connected to the memory device 22000. The memory controller 21000 is configured to access the memory device 22000. For example, the memory controller 21000 may be configured to control read, write, erase, and background operations of the memory device 22000. The memory controller 21000 is configured to provide an interface between the memory device 22000 and a host. The memory controller 21000 is configured to drive firmware for controlling the memory device 22000. The memory controller 21000 may be implemented identically to the memory controller 1100 described with reference to FIG. 1.

For example, the memory controller 21000 may include components such as a random access memory (RAM), a processor, a host interface, a memory interface, and an ECC.

The memory controller 21000 may communicate with an external device through the connector 23000. The memory controller 21000 may communicate with an external device (for example, the host) according to a specific communication standard. For example, the memory controller 21000 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 23000 may be defined by at least one of the various communication standards described above.

For example, the memory device 22000 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 21000 and the memory device 22000 may be integrated into one semiconductor device to configure a memory card. For example, the memory controller 21000 and the memory device 22000 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 22:
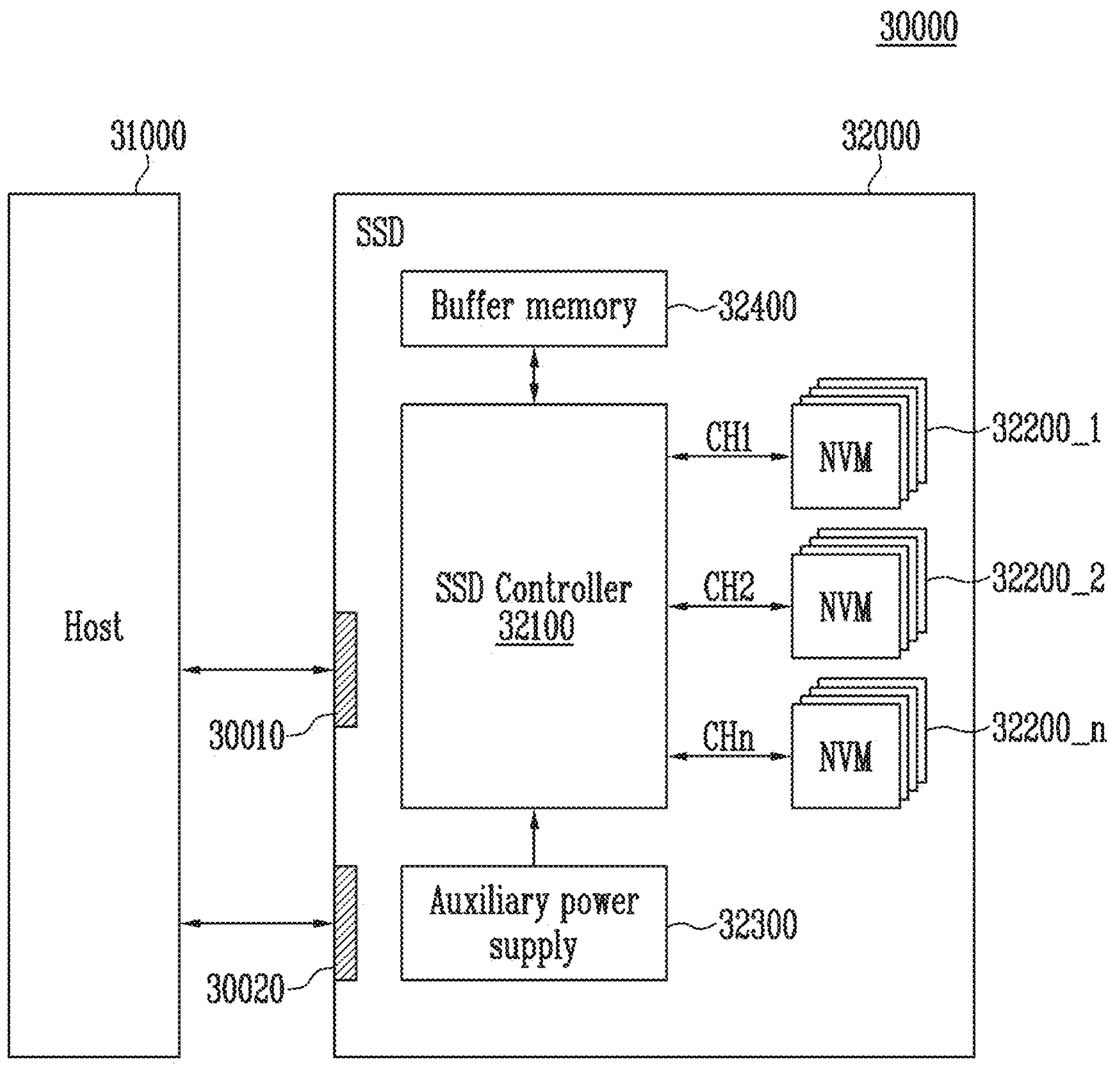
FIG. 22 is a block diagram illustrating a solid state drive (SSD) system to which a memory module according to an embodiment of the present disclosure is applied.

FIG. 22 is a block diagram illustrating a solid state drive (SSD) system to which a memory module according to an embodiment of the present disclosure is applied.

Referring to FIG. 22, the SSD system 30000 includes a host 31000 and an SSD 32000. The SSD 32000 exchanges a signal SIG with the host 31000 through a signal connector 30010 and receives power PWR through a power connector 30020. The SSD 32000 includes an SSD controller 32100, a plurality of flash memories 32200_1 to **32200_*n*, an auxiliary power device 32300, and a buffer memory 32400**.

According to an embodiment of the present disclosure, the SSD controller 32100 may perform the function of the memory controller described with reference to FIG. 1. The host 31000 may function the function of the host described with reference to FIG. 1.

The SSD controller 32100 may control the plurality of flash memories 32200_1 to **32200_*n* in response to the signal SIG received from the host 31000. For example, the signal SIG may be signals based on an interface between the host 31000 and the SSD 32000**. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 32300 is connected to the host 31000 through the power connector 30020. The auxiliary power device 32300 may receive the power PWR from the host 31000 and may charge the power. The auxiliary power device 32300 may provide power of the SSD 32000 when power supply from the host 31000 is not smooth. For example, the auxiliary power device 32300 may be positioned in the SSD 32000 or may be positioned outside the SSD 32000. For example, the auxiliary power device 32300 may be positioned on a main board and may provide auxiliary power to the SSD 32000.

The buffer memory 32400 operates as a buffer memory of the SSD 32000. For example, the buffer memory 32400 may temporarily store data received from the host 31000 or data received from the plurality of flash memories 32200_1 to 32200_*n*, or may temporarily store meta data (for example, a mapping table) of the flash memories 32200_1 to 32200_*n*. The buffer memory 32400 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 23:
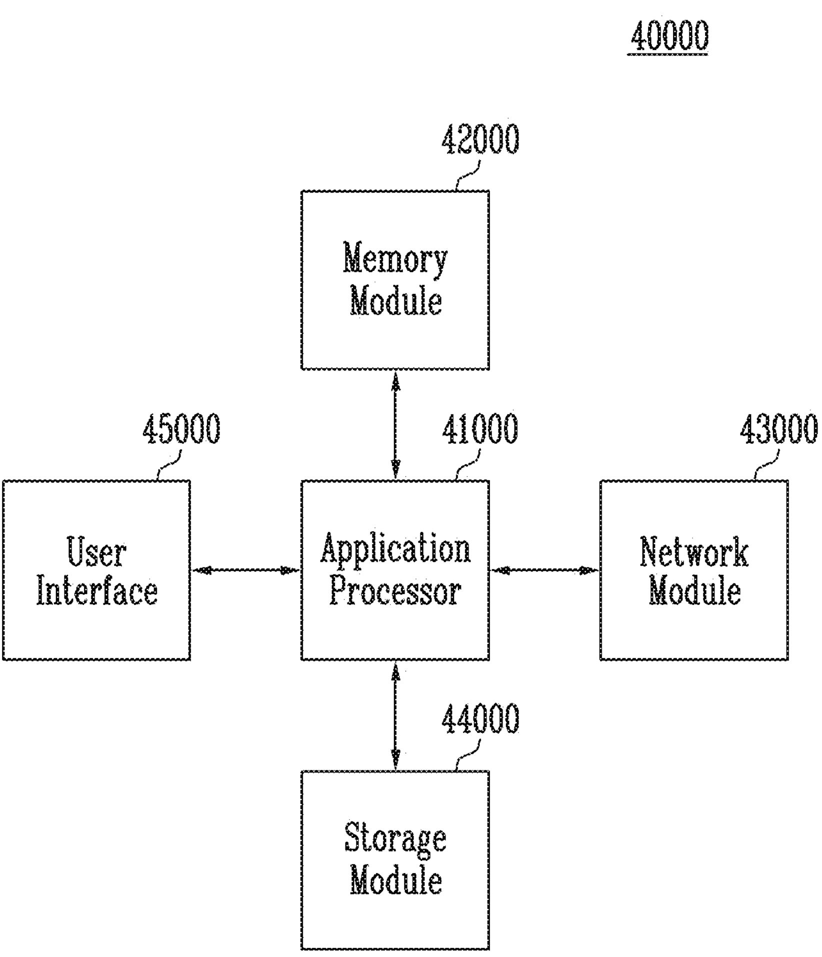
FIG. 23 is a block diagram illustrating a user system to which a memory module according to an embodiment of the present disclosure is applied.

FIG. 23 is a block diagram illustrating a user system to which a memory module according to an embodiment of the present disclosure is applied.

Referring to FIG. 23, the user system 40000 includes an application processor 41000, a memory module 42000, a network module 43000, a storage module 44000, and a user interface 45000.

The application processor 41000 may drive components, an operating system (OS), a user program, or the like included in the user system 40000. For example, the application processor 41000 may include controllers, interfaces, graphics engines, and the like that control the components included in the user system 40000. The application processor 41000 may be provided as a system-on-chip (SoC).

The memory module 42000 may operate as a main memory, an operation memory, a buffer memory, or a cache memory of the user system 40000. The memory module 42000 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. For example, the application processor 41000 and memory module 42000 may be packaged based on a package on package (POP) and provided as one semiconductor package.

The network module 43000 may communicate with external devices. For example, the network module 43000 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 43000 may be included in the application processor 41000.

The storage module 44000 may store data. For example, the storage module 44000 may store data received from the application processor 41000. Alternatively, the storage module 44000 may transmit data stored in the storage module 44000 to the application processor 41000. For example, the storage module 44000 may be implemented as a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 44000 may be provided as a removable storage device (removable drive), such as a memory card, and an external drive of the user system 40000.

For example, the storage module 44000 may include a plurality of nonvolatile memory devices, and the plurality of nonvolatile memory devices may operate identically to the memory device 1200 described with reference to FIG. 1. The storage module 44000 may operate identically to the memory module 1000 described with reference to FIG. 1.

The user interface 45000 may include interfaces for inputting data or an instruction to the application processor 41000 or for outputting data to an external device. For example, the user interface 45000 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 45000 may include user output interfaces such as a liquid crystal display (LCD), an organic light emitting diode (OLED) display device, an active matrix OLED (AMOLED) display device, an LED, a speaker, and a monitor.

Figure 24:
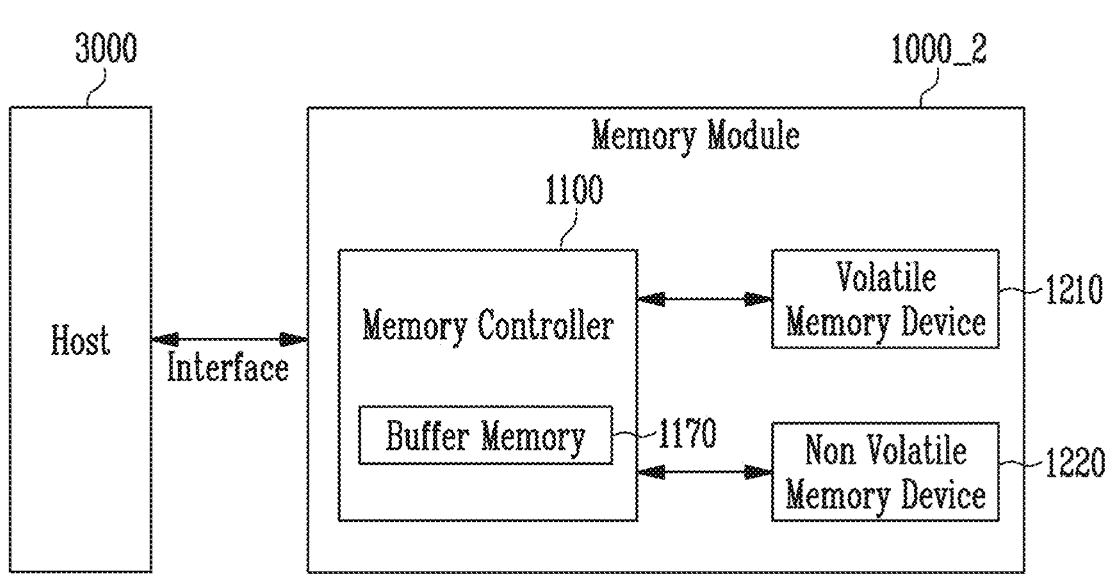
FIG. 24 is a diagram illustrating a configuration and an operation of a memory system according to an embodiment.

FIG. 24 is a diagram illustrating a configuration and an operation of a memory system according to an embodiment.

Referring to FIG. 24, the memory system 50 may include a memory module 1000_2 and a host 3000.

The memory module 1000_2 may communicate with the host 3000 through a compute express link (CXL) interface.

The memory module 1000_2 may include a memory controller 1100, a volatile memory device 1210, and a non-volatile memory device 1220 that stores data. The memory controller 1100 may include a buffer memory 1170.

The memory controller 1100 may control the volatile memory device 1210 and the non-volatile memory device 1220.

The memory controller 1100 may select candidate data to be prefetched to the volatile memory device 1210 based on access pattern information of the host 3000 for data stored in the non-volatile memory device 1220 and a plurality of algorithms. The memory controller 1100 may calculate a prefetch priority of the candidate data based on the access pattern information of the host 3000 and the plurality of algorithms. The plurality of algorithms may include at least one of a temporal locality algorithm, a spatial locality algorithm, a branch locality algorithm, an equidistant locality algorithm, and a sequential locality algorithm.

The memory controller 1100 may prefetch target data selected among the candidate data according to the prefetch priority from the non-volatile memory device 12200 to the volatile memory device 1210. For example, the memory controller 1100 may select data having the highest prefetch priority among the candidate data as the target data. The memory controller 1100 may select a set number of data in an order in which the prefetch order is high among the candidate data as the target data.

Figure 25:
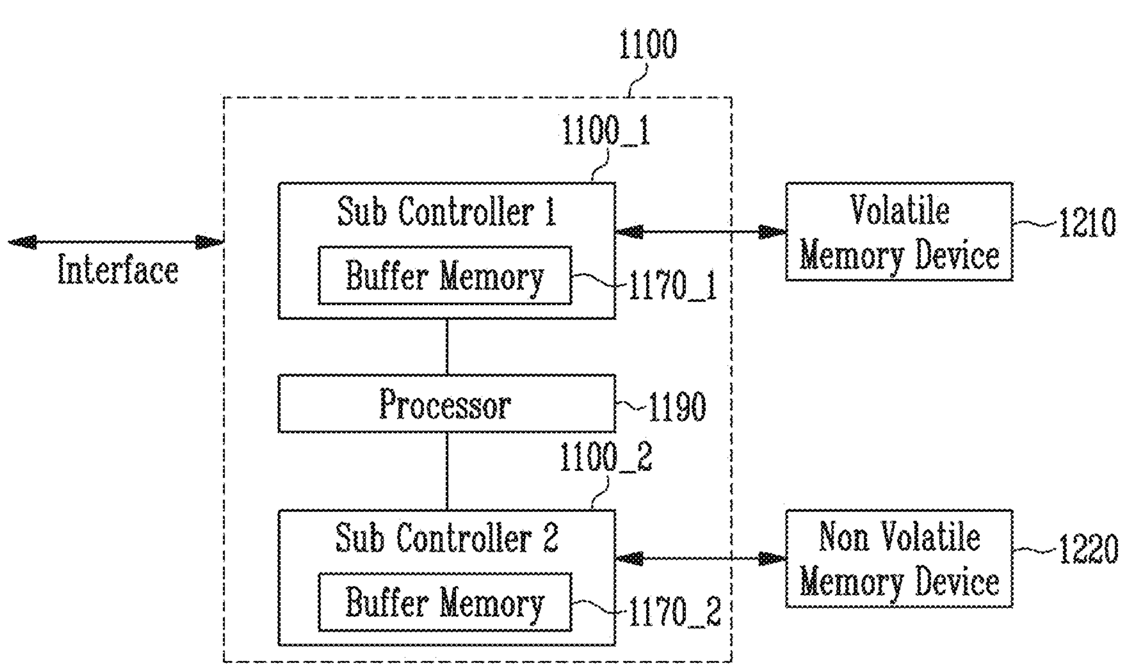
FIG. 25 is a diagram illustrating a configuration and an operation of a memory module of FIG. 24.

FIG. 25 is a diagram illustrating a configuration and an operation of the memory module of FIG. 24.

Referring to FIG. 25, the memory module 1000_2 may include the memory controller 1100, the volatile memory device 1210, and the non-volatile memory device 1220 that stores data.

The memory controller 1100 may include a first sub-controller 1100_1, a second sub-controller 1100_2, and a processor 1190.

The first sub-controller 1100_1 may control the volatile memory device 1210. The first sub-controller 1100_1 may include a buffer memory 1170_1. The second sub-controller 1100_2 may control the non-volatile memory device 1210. The second sub-controller 1100_2 may include a buffer memory 1170_2.

The processor 1190 may control data transmission between the host and the first sub-controller 1100_1 and the second sub-controller 1100_2 through a communication interface. The processor 1190 may calculate the prefetch priority of the candidate data based on the plurality of algorithms and the access pattern information of the host 3000 to the data stored in the non-volatile memory device 1220. The processor 1190 may prefetch the target data determined according to the prefetch priority of the candidate data from the non-volatile memory device 1220 to the volatile memory device 1210.

What is claimed is:

1. A memory module communicating with a host through a compute express link (CXL) interface, the memory module comprising:

a non-volatile memory device configured to store data;

a volatile memory device; and a memory controller configured to:

select a plurality of candidate data to be prefetched among the data based on access pattern information of the host for the data and a plurality of algorithms,; and calculate a priority for the plurality of candidate data by applying a different weight to the plurality of algorithms;

select target data having a highest priority among the plurality of candidate data; and prefetch the target data to the volatile memory device.

2. The memory module of claim 1, wherein the memory controller comprises:

a first controller configured to control the volatile memory device;

a second controller configured to control the non-volatile memory device; and a processor configured to control data transmission between the host, the first controller, and the second controller, and prefetch the target data determined according to a prefetch priority of the plurality of candidate data calculated based on the plurality of algorithms and the access pattern information of the host from the non-volatile memory device to the volatile memory device.

* * * * *